United States Patent
Tirronen et al.

(10) Patent No.: US 11,785,660 B2
(45) Date of Patent: Oct. 10, 2023

(54) EARLY DATA RETRANSMISSION OF MESSAGE 3

(71) Applicant: TELEFONAKTIEBOLAGET LM ERICSSON (PUBL), Stockholm (SE)

(72) Inventors: Tuomas Tirronen, Helsinki (FI); Andreas Höglund, Solna (SE); Emre Yavuz, Stockholm (SE); Olof Liberg, Stockholm (SE); Johan Bergman, Stockholm (SE); Yutao Sui, Solna (SE); Dung Pham Van, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 473 days.

(21) Appl. No.: 16/325,173

(22) PCT Filed: Aug. 10, 2018

(86) PCT No.: PCT/IB2018/056048
§ 371 (c)(1),
(2) Date: Feb. 12, 2019

(87) PCT Pub. No.: WO2019/030723
PCT Pub. Date: Feb. 14, 2019

(65) Prior Publication Data
US 2022/0418029 A1    Dec. 29, 2022

Related U.S. Application Data

(60) Provisional application No. 62/544,130, filed on Aug. 11, 2017.

(51) Int. Cl.
*H04W 76/19* (2018.01)
*H04W 72/23* (2023.01)
(Continued)

(52) U.S. Cl.
CPC ............. *H04W 76/19* (2018.02); *H04L 1/08* (2013.01); *H04W 72/1263* (2013.01); *H04W 72/23* (2023.01)

(58) Field of Classification Search
CPC . H04W 72/23; H04W 72/1263; H04W 76/19; H04W 74/0833; H04L 1/188; H04L 1/08; H04L 5/0053
See application file for complete search history.

(56) References Cited

U.S. PATENT DOCUMENTS

| 2009/0259910 A1 | 10/2009 | Lee et al. |
| 2016/0014815 A1 | 1/2016 | Vajapeyam et al. |

(Continued)

FOREIGN PATENT DOCUMENTS

| EP | 2849483 A1 | 3/2015 |
| WO | 2017135345 A1 | 8/2017 |

OTHER PUBLICATIONS

Ericsson, Report on [100#38][MTC/NB-IoT] Padding issue in Msg3, R2-1803077, 3GPP TSG-RAN WG2 #101, Athens, Greece, Feb. 26-Mar. 2, 2018.

(Continued)

*Primary Examiner* — Chi Ho A Lee

(57) ABSTRACT

According to certain embodiments, a method performed by a wireless device includes transmitting, to a base station, a first transmission of a message, which includes user data and information to setup or resume a connection between the wireless device and the base station. DCI comprising an uplink grant indicating a plurality of transport block sizes is received from the base station. The DCI is interpreted based on previous information received in a message from the base station. One of the transport block sizes is selected for retransmission of the message. The message is retransmitted using the selected transport block size and includes either only the information to setup or resume the connection or the
(Continued)

information to setup or resume the connection and user data. The message is retransmitted using the selected transport block size.

46 Claims, 25 Drawing Sheets

(51) Int. Cl.
 *H04L 1/08* (2006.01)
 *H04W 72/1263* (2023.01)

(56) References Cited

U.S. PATENT DOCUMENTS

| | | |
|---|---|---|
| 2017/0019930 A1 | 1/2017 | Lee |
| 2017/0064919 A1* | 3/2017 | Pinsky .................. B25J 11/0045 |
| 2018/0270807 A1* | 9/2018 | Salem .................. H04L 5/0091 |
| 2019/0075563 A1* | 3/2019 | Babaei .................. H04L 5/0094 |
| 2019/0150184 A1* | 5/2019 | Golitschek Edler von Elbwart ... H04L 1/1887 370/329 |
| 2019/0191486 A1* | 6/2019 | Myung .................. H04W 80/08 |
| 2019/0335496 A1* | 10/2019 | Li .......................... H04L 1/1887 |
| 2019/0342864 A1* | 11/2019 | Hwang .................. H04L 1/1854 |
| 2020/0077453 A1* | 3/2020 | Babaei .................. H04L 5/0094 |
| 2020/0213032 A1* | 7/2020 | Yeo ........................ H04L 1/0006 |
| 2020/0213901 A1* | 7/2020 | Yoshimoto ............ H04L 5/0048 |

OTHER PUBLICATIONS

ETSI TS 136 213 V14.3.0 ETSI Technical Specification LTE; Evolved Universal Terrestrial Radio Access (E-UTRA); Physical layer procedures (3GPP 36.213 version 14.3.0 Release 14), Aug. 2017.
3GPP TS 36.331 V1 4.3.0 3rd Generation Partnership Project; Technical Specification Group Radio Access Network; Evolved Universal Terrestrial Radio Access (E-UTRA); Radio Resource Control (RRC); Protocol specification (Release 14), Jun. 2017.
Ericsson, et al., Revised WID on Even further enhanced MTC for LTE, RP-171427 (revision of RP-170732), 3GPP TSG RAN Meeting #76, West Palm Beach, USA, Jun. 5-8, 2017.
3GPP TS 36.321 V14.3.0 3rd Generation Partnership Project; Technical Specification Group Radio Access Network; Evolved Universal Terrestrial Radio Access (E-UTRA); Medium Access Control (MAC) protocol specification (Release 14), Jun. 2017.
ETSI TS 136 300 V14.3.0 ETSI Technical Specification LTE; Evolved Universal Terrestrial Radio Access (E-UTRA) and Evolved Universal Terrestrial Radio Access Network (E-UTRAN); Overall description; Stage 2 (3GPP TS 36.300 version 14.3.0 Release 14), Jul. 2017.

* cited by examiner

FIGURE 22

Battery life [Years]

| Reporting interval | DL Packet size (byte) | UL Packet size (byte) | 144 dB MCL Resume Early | 144 dB MCL Resume | 144 dB MCL Gain (%) | 154 dB MCL Resume Early | 154 dB MCL Resume | 154 dB MCL Gain (%) | 164 dB MCL Resume Early | 164 dB MCL Resume | 164 dB MCL Gain (%) |
|---|---|---|---|---|---|---|---|---|---|---|---|
| 1 hour | 20 | 20 | 23.78 | 30.04 | 26.32 | 12.18 | 16.2 | 33.00 | 1.76 | 2.47 | 40.34 |
| 2 hours | 65 | 50 | 28.97 | 33.09 | 14.22 | 15.99 | 19.16 | 19.82 | 2.27 | 2.95 | 29.96 |
| 2 hours | 65 | 200 | 26.9 | 30.53 | 13.49 | 9.52 | 10.7 | 12.39 | 1.01 | 1.12 | 10.89 |
| 24 hours | 65 | 50 | 37.35 | 37.85 | 1.34 | 34.35 | 35.4 | 3.06 | 16.52 | 19.16 | 15.98 |
| 24 hours | 65 | 200 | 37.04 | 37.55 | 1.38 | 30.63 | 31.56 | 3.04 | 9.38 | 10.18 | 8.53 |
| 24 hours | 20 | 200 | 37.05 | 37.56 | 1.38 | 30.66 | 31.6 | 3.07 | 9.43 | 10.24 | 8.36 |

FIGURE 23

| Reporting interval | UL Packet size (byte) | 144 dB MCL | | | 154 dB MCL | | | 164 dB MCL | | |
|---|---|---|---|---|---|---|---|---|---|---|
| | | Resume | Early | Gain (%) | Resume | Early | Gain (%) | Resume | Early | Gain (%) |
| 2 hours | 50 | 29.93 | 33.19 | 10.89 | 16.92 | 19.43 | 14.83 | 2.47 | 3.05 | 23.48 |
| | 200 | 27.73 | 30.62 | 10.42 | 9.85 | 10.78 | 9.44 | 1.05 | 1.14 | 8.57 |
| 24 hours | 50 | 37.48 | 37.87 | 1.04 | 34.7 | 35.48 | 2.25 | 17.37 | 19.53 | 12.44 |
| | 200 | 37.17 | 37.57 | 1.08 | 30.9 | 31.62 | 2.33 | 9.65 | 10.28 | 6.53 |

FIGURE 24

| Reporting interval | DL Packet size (byte) | 144 dB MCL | | | 154 dB MCL | | | 164 dB MCL | | |
|---|---|---|---|---|---|---|---|---|---|---|
| | | Resume | Early | Gain (%) | Resume | Early | Gain (%) | Resume | Early | Gain (%) |
| 2 hours | 65 | 29.7 | 34.04 | 14.61 | 20.81 | 26.51 | 27.39 | 4.48 | 7.15 | 59.60 |
| | 20 | 29.76 | 34.11 | 14.62 | 21.02 | 26.84 | 27.69 | 4.67 | 7.57 | 62.10 |
| 24 hours | 65 | 37.45 | 37.96 | 1.36 | 35.84 | 36.98 | 3.18 | 23.53 | 28.13 | 19.55 |
| | 20 | 37.45 | 37.96 | 1.36 | 35.89 | 37.03 | 3.18 | 23.95 | 28.64 | 19.58 |

FIGURE 25

| Parameter | Assumption |
|---|---|
| MIB | 24 bits |
| SIB1-BR | 152 bits |
| Higher layer procedure | RRC Resume |
| PDCP | Data: 1 byte, Signalling: 5 bytes |
| RLC | 2 byte |
| MAC | 2 byte |
| Random Access Response | 7 byte |
| RRC Connection Resume Request SDU | 6 byte |
| RRC Connection Resume PDU | 2 byte |
| RRC Connection Resume Complete PDU | 3 bytes |
| RRC Connection Release PDU | 8 byte |

FIGURE 26

| Parameter | Assumption |
|---|---|
| Propagation condition | ETU, EPA |
| Fading | Rayleigh, 1 Hz |
| Mobile NF | 5 dB |
| Base station NF | 3 dB |
| Device power class | 23 dBm |
| LTE system BW | 10 MHz |
| Base station power class | 46 dBm |
| Power boosting | 3 dB on PSS/SSS, MIB |
| Coupling loss | 144, 154, 164 dB |
| Targeted link level performance | PSS/SSS, PBCH, SIB1-BR: 90th percentile acquisition time<br>PDSCH, PUSCH: 10% BLER<br>MPDCCH, PUCCH, PRACH: 10% BLER |
| Link level scenario | Sensitivity limited |
| SIB1-BR repetitions | 16 |

FIGURE 27

| Coupling loss | PDSCH 10% BLER 932 bit TBS | PUSCH 10% or 40% BLER 932,512 or 392 bit TBS | MPDCCH 10% BLER | PUCCH F1A 10% BLER | PRACH F0 10% BLER | PSS/SSS Avg./90th percentile | MIB Avg./90th percentile | SIB1-BR Avg./90th percentile |
|---|---|---|---|---|---|---|---|---|
| 144 | 8 | 16 10% BLER 932 bit TBS | 1 | 1 | 2 | 40/40 | 40/40 | 80/80 |
| 154 | 64 | 256 10% BLER 932 bit TBS | 16 | 8 | 16 | 40/40 | 40/40 | 80/80 |
| 164 | 1024 | 2048 10% BLER 392 bit TBS 1024 42% BLER 512 bit TBS | 64 | 32 | 128 | 240/460 | 152/520 | 334/1040 |

EARLY DATA RETRANSMISSION OF MESSAGE 3

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Cat-M1, Cat-M2), supporting reduced bandwidth of up to 6 and 24 physical resource blocks (PRBs), and Narrowband IoT (NB-IoT) UEs providing a new radio interface (and UE categories, Cat-NB1 and Cat-NB2).

This disclosure refers to the LTE enhancements introduced in 3GPP Release 13,14 and 15 for MTC as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC (likewise for NB-IoT). Some important differences include new physical channels, such as the physical downlink control channels, called MPDCCH in eMTC and NPDCCH in NB-IoT, and a new physical random access channel, NPRACH, for NB-IoT.

For 3GPP Release 15, new work items (WIs) "Even further enhanced MTC for LTE (LTE_eMTC4)" (referred to herein as WI_eMTC) and "Further NB-IoT enhancements (NB_IOTenh2)" (referred to herein as WI_NBIOT) target eMTC and NB-IoT enhancements, respectively. In both of these WIs, one goal is to reduce UE power consumption and latency through introducing possibility to send data as early as possible during the Random Access procedure. For example, WI_eMTC supports early data transmission in RAN2 lead, RAN1, and RAN3. Power consumption/latency gain is evaluated and necessary support is specified for DL/UL data transmission on a dedicated resource during the Random Access procedure (after PRACH transmission and before the RRC connection setup is completed) at least in the RRC Suspend/Resume case. WI_NBIOT discloses evaluating power consumption/latency gain and specifying necessary support for DL/UL data transmission on a dedicated resource during the Random Access procedure after NPRACH transmission and before the RRC connection setup is completed for RAN2, RAN1, and RAN3.

This disclosure calls such a feature, where data can be sent during Random Access procedure "early data" feature, meaning that data can be sent earlier when compared to current LTE specifications (that is, after RRC connection setup or resume has been completed). This includes the case where data is multiplexed with RRCConnectionSetupComplete message.

The currently specified random access and connection control procedures can be found in TS36.321 and TS36.331.

FIG. 1 illustrates the contention based Random Access (RA) procedure from TS36.300. As depicted, the messages in FIG. 1 are commonly referred to as message 1 (msg1) through message 4 (message 4). The structure of MAC layer protocol data units (PDUs) are defined in TS36.321. The structure of the grant included in the MAC RAR is defined in TS36.213.

During the random access procedures, after receiving the random access response from the eNB, the UE sends the RRC connection request or RRC connection resume request, which is also known as message 3. There is a chance that the message 3 is not received at the eNB or received with errors. The eNB can then request the UE to retransmit message 3.

In the current system, in RRC_IDLE mode message 3 retransmission is scheduled via DCI which is scrambled by Temporary C-RNTI (in short TC-RNTI). And in RRC_CONNECTED mode, depending whether the random access procedures are contention based or contention free, the message 3 retransmission is scheduled via DCI which is either scrambled by Temporary C-RNTI or a C-RNTI. Using BL/CE UEs (a.k.a LTE-M UEs) as an example, TS36.213 states:

If a UE is configured by higher layers to decode PDCCHs with the CRC scrambled by the Temporary C-RNTI regardless of whether UE is configured or not configured to decode PDCCHs with the CRC scrambled by the C-RNTI, the UE shall decode the PDCCH according to the combination defined in Table 8-6 and transmit the corresponding PUSCH. The scrambling initialization of PUSCH corresponding to these PDCCH is by Temporary C-RNTI.

If a UE is configured by higher layers to decode MPDCCHs with the CRC scrambled by the Temporary C-RNTI regardless of whether UE is configured or not configured to decode MPDCCHs with the CRC scrambled by the C-RNTI during random access procedure, the UE shall decode the MPDCCH according to the combination defined in Table 8-6A and transmit the corresponding PUSCH. The scrambling initialization of PUSCH corresponding to these MPDCCH is by Temporary C-RNTI.

If a Temporary C-RNTI is set by higher layers, the scrambling of PUSCH corresponding to the Random Access Response Grant in Subclause 6.2 and the PUSCH retransmission for the same transport block is by Temporary C-RNTI. Else, the scrambling of PUSCH corresponding to the Random Access Response Grant in Subclause 6.2 and the PUSCH retransmission for the same transport block is by C-RNTI.

If a UE is also configured by higher layers to decode MPDCCH with CRC scrambled by the C-RNTI during random access procedure, the UE shall decode the MPDCCH according to the combination defined in Table 8-6A and transmit the corresponding PUSCH. The scrambling initialization of PUSCH corresponding to these MPDCCH is by C-RNTI.

Table 8-6: PDCCH Configured by Temporary C-RNTI

TABLE 8-6

| PDCCH configured by Temporary C-RNTI | |
|---|---|
| DCI format | Search Space |
| DCI format 0 | Common |

Table 8-6A: MPDCCH Configured by Temporary C-RNTI and/or C-RNTI During Random Access Procedure

TABLE 8-6A

| MPDCCH configured by Temporary C-RNTI and/or C-RNTI during random access procedure | |
|---|---|
| DCI format | Search Space |
| DCI format 6-0A, 6-0B | Type2-Common |

There currently exist certain challenge(s). For example, currently, in LTE, it is not possible to send uplink or downlink data before the contention based random access procedure has been completed, that is not before message 4 has been transmitted by the eNB and successfully received by the UE.

As the random access procedure is the method for the UE to get dedicated network resources and make its identity known to the eNB, the eNB does in general not know in advance the UE identity until after contention has been resolved. Also, the eNB does not know the capabilities of the UE, thus a method for sending early data cannot rely on the eNB knowing which type of UEs have initiated the random access procedure and if they support early data transmission or not.

One possible solution to this problem includes the eNB provides two UL grants to the UE accessing the system in the random access response (RAR) in message 2. This first grant is to be used by Release 13 and 14 UEs for continuing the connection setup, while the second grant is intended to support connection setup and early data transmission for UEs capable of this new feature. The UE selects among the two provided grants (one with a smaller and Rel-13 compliant TBS, and one new and with a larger TBS). This will introduce new requirements on the eNB. The eNB is required to blindly detect which of the two grants the UE responded to. Dual grants may also lead to a waste of UL radio resources, as the UE may only use one out of the two allocated uplink grants. In another solution, the idea of dual UL grant may be further improved that using the resources provided by the first grant, the UE can indicate whether it intends to use the second grant. A UE indicates in the first UL message 3 that the second allocated UL resource is also used. Furthermore, UEs not supporting this feature, e.g. Release 13 and 14, are not able to comprehend any new formats specified after Release 14, and therefore, the messages and Random Access procedure can only be changed in a backwards compatible manner.

However, there is no solution of how the message 3 is retransmitted. Since there are two UL grants involved, failure scenarios are different and retransmission mechanisms become more complicated comparing to the case of only one UL grant. For the solutions discussed above, if the message 3 is not received, the eNB has no possibility to know whether the UE supports early data transmission or not. Additionally, where the two UL transmissions are related, if the first UL transmission is received with error or lost, the eNB would have troubles decoding the data in the $2^{nd}$ UL transmission (message 3' in figures below) if the UE identify is carried in the $1^{st}$ UL message 3.

SUMMARY OF THE INVENTION

Certain aspects of the present disclosure and their embodiments may provide solutions to these or other challenges.

According to certain embodiments, a method performed by a wireless device for retransmitting message 3 includes transmitting, to a base station, a first transmission of a message 3. The message 3 comprising information to setup or resume a connection between the wireless device and the base station and user data. Downlink control information (DCI) is received from the base station. The DCI comprises an uplink grant indicating a plurality of transport block sizes and is interpreted by the wireless device based on previous information received in a message 2 from the base station. One of the plurality of transport block sizes is selected for retransmission of the message 3. The retransmission of the message 3 comprises either only the information to setup or resume the connection or the information to setup or resume the connection and user data to be sent to the base station. The message 3 is retransmitted using the selected one of the plurality of transport block sizes.

According to certain embodiments, a wireless device includes processing circuitry and power supply circuitry configured to supply power to the wireless device. The processing circuitry is configured to transmit, to a base station, a first transmission of a message 3. The message 3 comprises information to setup or resume a connection between the wireless device and the base station and user data. The processing circuitry receives DCI from the base station. The DCI comprises an uplink grant indicating a plurality of transport block sizes and is interpreted by the wireless device based on previous information received in a message 2 from the base station. The processing circuitry selects one of the plurality of transport block sizes for retransmission of the message 3. The retransmission of the message 3 comprises either only the information to setup or resume the connection or the information to setup or resume the connection and user data to be sent to the base station. The message 3 is retransmitted using the selected one of the plurality of transport block sizes.

According to certain embodiments, a method performed by a base station for receiving a message 3 includes transmitting, to a wireless device, DCI to schedule a retransmission of a message 3. The DCI is interpreted by the wireless device based on the content of previous message 2 and includes an uplink grant indicating one or a plurality of transport block sizes. The retransmission of the message 3 is received from the wireless device and is transmitted based on one or more of the plurality of transport block sizes in the DCI. The retransmission of the message 3 comprises either only information to set up or resume a connection between the wireless device and the base station or both information to setup or resume the connection between the wireless device and the base station and user data.

According to certain embodiments, a network node includes processing circuitry and power supply circuitry configured to supply power to the wireless device. The processing circuitry is configured to transmit, to a wireless device, DCI to schedule a retransmission of a message 3. The DCI is interpreted by the wireless device based on the content of previous message 2 and includes an uplink grant indicating one or a plurality of transport block sizes. The processing circuitry is configured to receive the retransmission of the message 3 from the wireless device, which was transmitted based on one or more of the plurality of transport block sizes in the DCI. The retransmission of the message 3 comprises either only information to set up or resume a connection between the wireless device and the base station or both information to setup or resume the connection between the wireless device and the base station and user data.

Certain embodiments may provide one or more of the following technical advantage(s). For example, certain embodiments disclosed herein provide an effective solution for retransmitting single or multiple transmissions (one or both multiplexed with Message 3) when dual UL grant is used during random access procedure. The solutions take advantage of multiple UL transmissions and solve the problem of retransmission of one or both UL transmissions.

BRIEF DESCRIPTION OF THE DRAWINGS

FIG. 22 illustrates results for early data transmission in Message 3 and Message 4 (MO event).

FIG. 23 illustrates results for early data in Message 4 (MT event).

FIG. 24 summarizes the results of downlink transmission only (Message 4).

FIG. 25 summarizes assumptions on core network protocol overheads and RRC message sizes.

FIG. 26 summarizes radio related assumptions.

FIG. 27 summarizes assumed transmission times/repetitions for different channels at 144, 154, and 164 dB coupling losses.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain embodiments disclosed herein include methods of how to handle the retransmission of mgs3 and message 3' in a system where dual UL grant is employed during the random access procedure. As another example, certain embodiments disclosed herein allow for an indication in the Message 3 corresponding to a first grant, if the UE will use a second optional Message 3 corresponding to a second grant. As another example, certain embodiments provide a way to retransmit the UL message 3 when dual UL grant is used during random access procedure. Note that there may be a need to retransmit just the first message 3, just the second message 3, or both of them. There may even be a need to retransmit one or both of them more than once before both of them have been successfully received by eNB.

Figure 1:
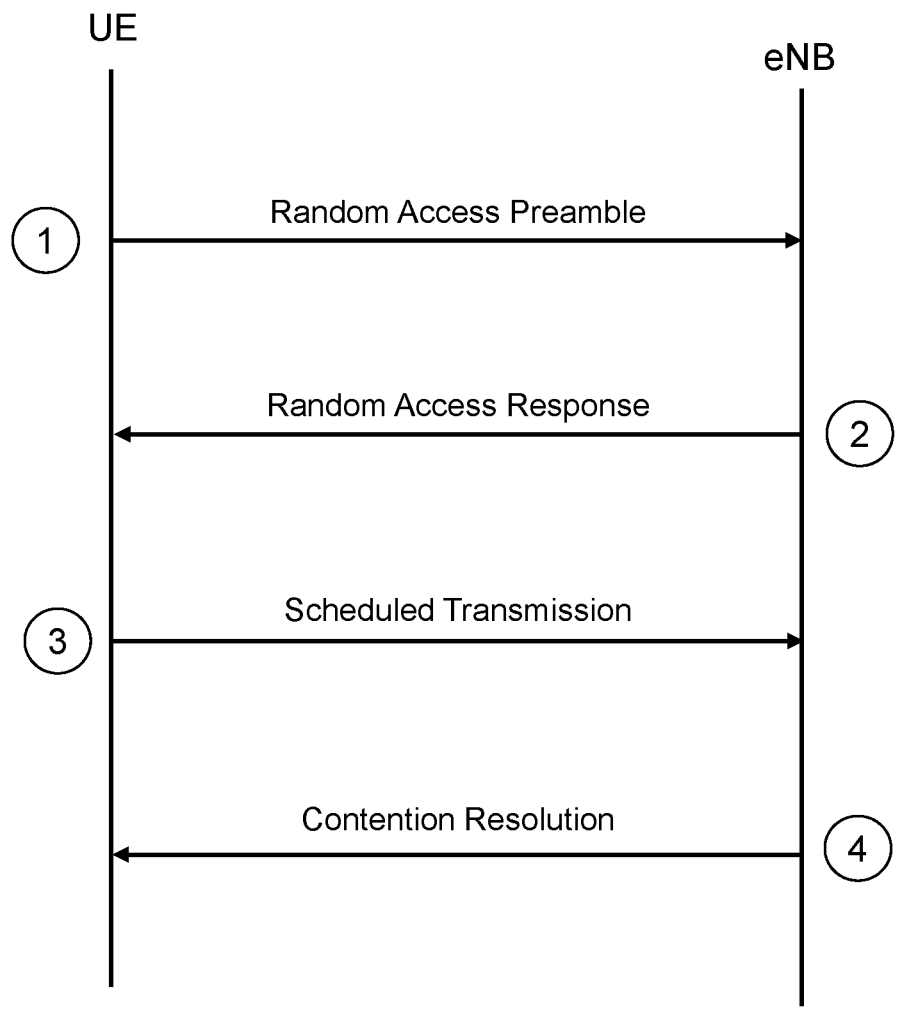
FIG. 1 illustrates the contention based Random Access (RA) procedure from TS36.300.
Figure 2:
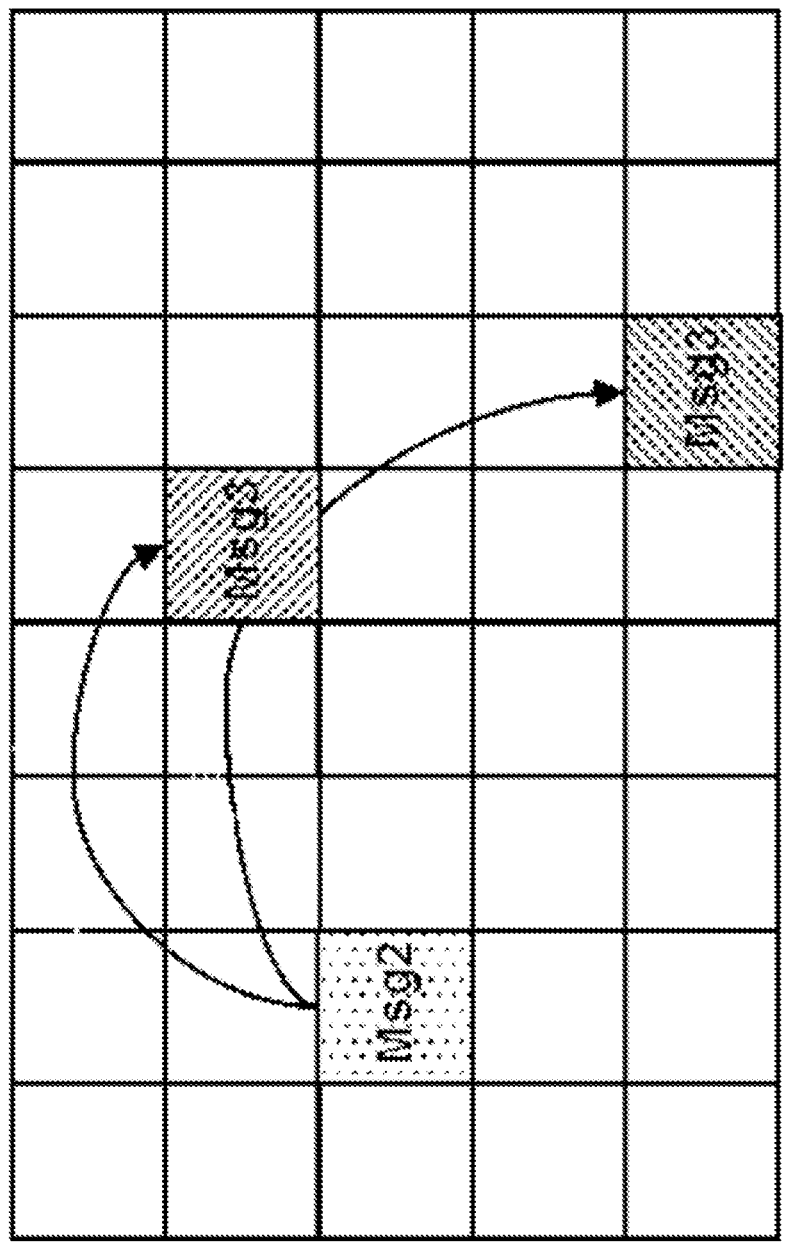
FIG. 2 is a graphical representation for providing dual grants in separate time- and frequency-resources, according to certain embodiments.
Figure 3:
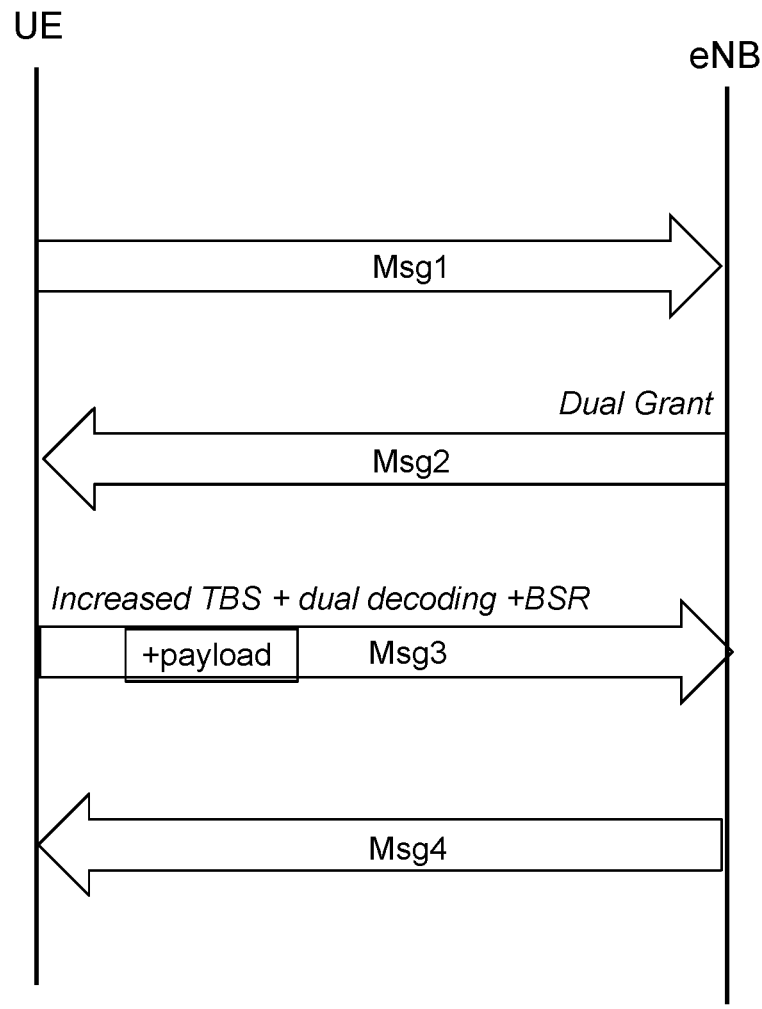
FIG. 3 illustrates signalling on a general level using the dual grant, according to certain embodiments.

According to certain embodiments, a UE may select among two provided grants (one with a smaller and Rel-13 compliant TBS, and one new and larger TBS. FIGS. 2 and 3 are used for illustration purposes. FIG. 2 illustrates a graphical representation for providing dual grants in separate time- and frequency-resources, according to certain embodiments. FIG. 3 illustrates signalling on a general level using the dual grant, according to certain embodiments.

According to certain embodiments, the retransmission of message 3 is not scheduled by using DCI but in a similar way as the UL grant conveyed in the random access response (RAR) message used to schedule the initial message 3 transmission. That is, instead of directly using a DCI to schedule the retransmission of message 3, a DCI is used to schedule a NPDSCH/PDSCH transmission that carries the scheduling information (can be dual grants also, e.g., similar as the one in RAR in message 2) for the retransmission of message 3. The situation is discussed below on a case-by-case basis.

In a first case, the UE only uses the resource in the first UL grant to transmit message 3, and this message 3 is not lost. In this scenario, the eNB is not certain whether the UE is using the UL resource indicated by first UL grant or the second UL grant. Different solutions are disclosed.

In a particular embodiment, for example, the eNB only schedules the retransmission of message 3 according to the Release 13 or release 14 procedure. That is, no dual UL grants are provided to schedule the retransmission of message 3. For example, if the UL transmission using the first UL grant fails, eNB will provide a retransmission grant for the first and both eNB and UE shall fall back to Release 13 or release 14 behaviour. But if the UL transmission using the second UL grant fails, the UE should expect a retransmission in the same way as release 13 or release 14 procedures.

In another particular embodiment, the eNB may provide dual UL grants via two DCIs to schedule the retransmission of message 3. There is a one-to-one mapping between the two DCIs to the two UL grants the UE chose at the beginning for the initial message 3 transmissions. The resource allocation indicated in one of the DCIs is used for the retransmission of message 3 if at the beginning the UE used the resource allocation indicated by the first UL grant, and the resource indicated in the other DCI is used for the retransmission of message 3 if at the beginning the UE used the resource allocation indicated by the second UL grant.

In another particular embodiment, two DCIs are scrambled by different RNTIs, and the RNTIs can be provided in the UL grants in the random access response messages. The different RNTIs can either be obtained by partitioning the existing RNTI space (e.g., to reserve some the Temporary C-RNTIs for each of the UL grants) or to define new RNTIs. Alternatively, the new RNTIs may be defined only for the DCI that schedules the retransmission of message 3 where for the initial message 3 transmission at the beginning the UE used the resource allocation indicated by the second UL grant.

In yet another particular embodiment, the DCI used to schedule the retransmission message 3 scheduled by the second UL grant for the initial message 3 transmission at the beginning is in a different MPDCCH/NPDCCH search space than the one used to schedule the retransmission of message 3 scheduled by the first UL grant for the initial message 3 transmission at the beginning.

In still another particular embodiment, the MPDCCH/NPDCCH search space for the DCI used to schedule the retransmission of the message 3 scheduled by the second UL grant for the initial message 3 transmission at the beginning is configured in relation to the search space for the DCI used to schedule the retransmission of the message 3 scheduled by the first UL grant for the initial message 3 transmission at the beginning. A non-exclusive example is that there is a time offset between the starting subframe of the search space for the DCI used to schedule the retransmission message 3 scheduled by the second UL grant at the beginning, and the starting subframe of the search space for the DCI used to schedule the retransmission message 3 scheduled by the first UL grant at the beginning.

In another particular embodiment, the configurations of the MPDCCH/NPDCCH search spaces for the DCIs used to schedule the retransmission of message 3 are given in the SI, or in the random access response message.

In a particular embodiment, the UE may retransmit message 3 if it has not received an acknowledgement or contention resolution message after a well-defined period of time. This can be achieved for example by using a timer, which would be started after the first message 3 is transmitted, and the UE would retransmit upon the timer expiry. The UE could in this case re-use the previously provided first or second UL grant (depending e.g. on the data size). The used frequency resources can be the same as in the initial grants or then shifted. The time resources provided in the first set of grants map to a later time as the initial transmission was lost. The used timer, possible shift in frequency resources and mapping of time resources can be configured in a cell or per UE (e.g. using RRC protocol and/or based on information in the RAR message) or be fixed in the specifications. In one example the timer is the MAC contention resolution timer, as described in TS 36.321, but upon timer expiry the UE does not consider the contention resolution not successful and select a new preamble. Rather, the UE does a message 3 retransmission instead. This may be a special case for message 3 retransmission with dual grants operation only.

In a particular embodiment, only one DCI may be sent by eNB asking for the UE to retransmit message 3. The UE may combine information provided in the DCI with the information in the dual grants transmitted during previous step (i.e., in message 2/RAR). In one non-limiting example, this retransmission request DCI provides new time and frequency resources for the UE to use, where the rest of the information is taken from the dual grants sent by the eNB in the previous step. In one example, this DCI provides two sets of such time/frequency resource separately for the first and the second UL grant. In these examples, the provided information in the DCI can be some other parameter than time/frequency resource, or a combination of many parameters.

In a second case, the UE uses the resource in the second UL grant to transmit message 3, and this message 3 is lost. This case is similar to the first case described above, and the solutions are similar to the ones outlined for the first case. Specifically, there may be a fall back to Rel-13, an indication in DCI, a timer based solution, and separate search spaces.

In a third case, the UE uses the resource in the first UL grant to transmit message 3, and this message 3 cannot be decoded correctly. In this scenario, the eNB may be certain that the UE uses the resource indicated in the first UL grant (e.g., the eNB detects significantly higher energy in the UL resource indicated by the first UL grant than in the UL resource indicated by the second UL grant), and therefore, the eNB does not need to send dual UL grants.

In a particular embodiment, for example, for the retransmission of message 3, the eNB first identifies that the first UL resource is used (the second UL resource is not used) and provides UL grant for retransmission assuming the UE is only capable of using the first UL grant. That is saying, for example, no support of larger TBS.

In another particular embodiment, a similar timer-based solution is adopted as in the first case, and the UE may retransmit message 3 upon expiry of a timer. For example, the UE may assume the previous UL grant except, for example, the timing which is determined based on an offset, expiry of a timer etc.

In a fourth case, the UE uses the resource in the second UL grant to transmit message 3, and this message 3 cannot be decoded correctly. In this scenario, the eNB may be certain that the UE uses the resource indicated in the second UL grant (e.g., the eNB detects significant higher energy in the UL resource indicated by the second UL grant than in the UL resource indicated by the first UL grant), and therefore, the eNB may not need to send dual UL grants. The eNB may also be certain that the UE has higher capability.

In a particular embodiment, for example, when the eNB is certain that the UE is capable of using the second UL grant, for the retransmission of message 3, the eNB can either provide a new UL grant in the same way as the release 13 and release 14 case, or provide a new grant assuming UE is capable of early data. That is saying, for example, a larger TBS than the release 13 and release 14 case and potentially new MCS.

In a particular embodiment, a similar timer-based solution may be adopted as described above for the first case, and the UE may retransmit message 3 upon expiry of a timer.

Figure 4:
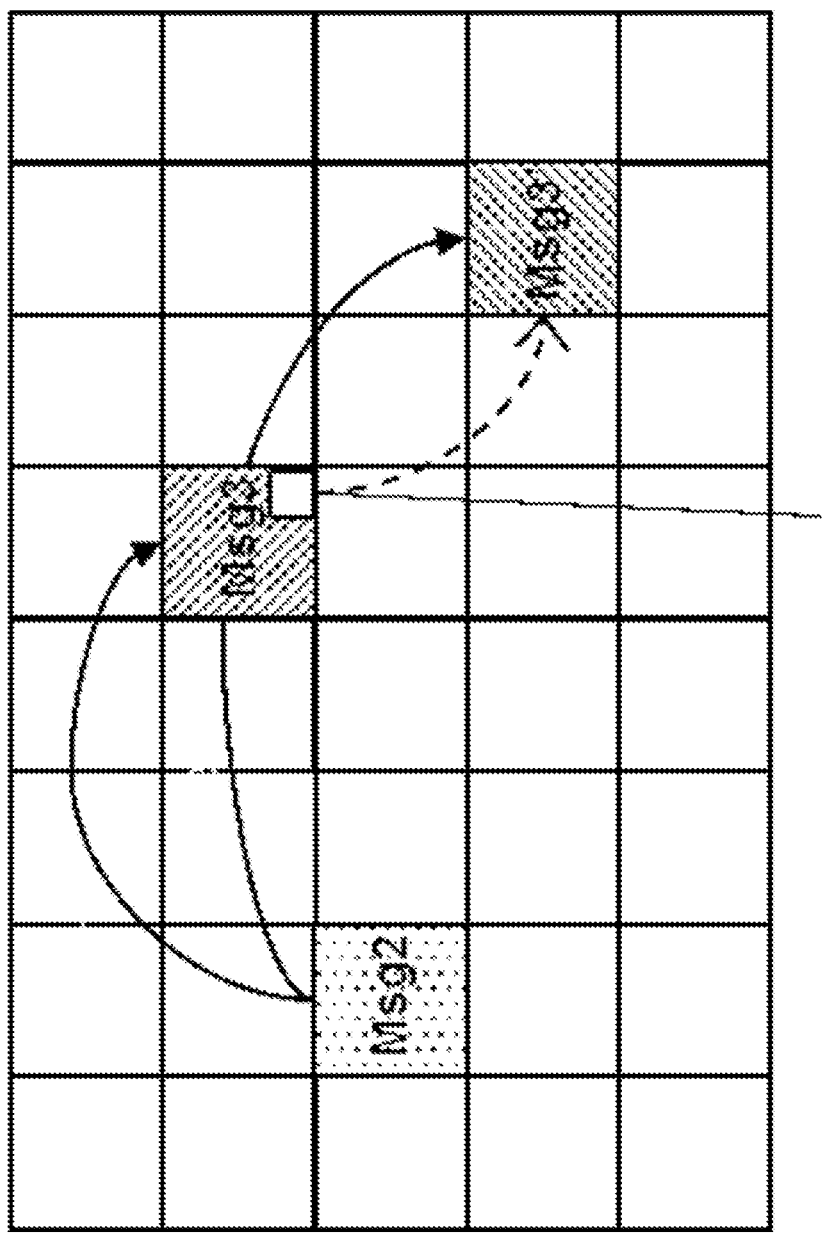
FIG. 4 is a graphical representation of (N)PDCCH Message 2 containing two UL (N)PUSCH grants for Message 3 transmission in which the UE indicates in the first (Message 3) whether the second will be used (Message 3'), according to certain embodiments.
Figure 5:
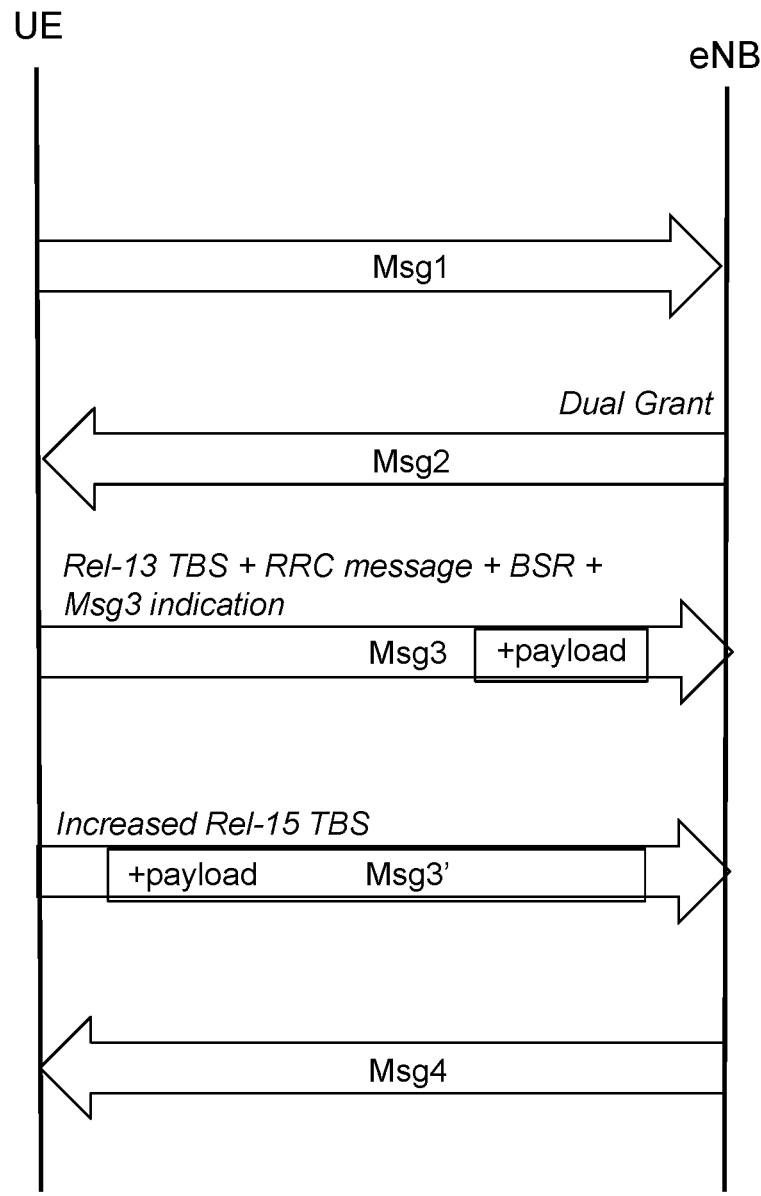
FIG. 5 illustrates a signalling diagram for the indication of Message 3' transmission in Message 3, according to certain embodiments.

According to certain embodiments, the UE may indicate in the first UL message 3 that the second allocated UL resource is also used. As used in this scenario, message 3 refers to the UL transmission indicated in the first UL grant, and message 3' refers to the UL transmission indicated in the second UL grant. FIGS. 4 and 5 are provided for illustration. is case. Specifically, FIG. 4 is a graphical representation of (N)PDCCH Message 2 containing two UL (N)PUSCH grants for Message 3 transmission in which the UE indicates in the first (Message 3) whether the second will be used (Message 3'), according to certain embodiments. FIG. 5 illustrates a signalling diagram for the indication of Message 3' transmission in Message 3, according to certain embodiments.

For this situation, in order to assist the eNB, it is also beneficial to indicate in message 3' (scheduled by the $2^{nd}$ UL grant) that dual grant is used, as well as to include the UE identity.

In a particular embodiment, in message 3' which is scheduled by the 2nd UL grant, an indication of the use of the UL resource of the $1^{st}$ UL grant is used (i.e., message 3).

In a particular embodiment, in message 3', the UE identity is included.

In a particular embodiment, in message 3', the UE identity is indicated either in the same way as in message 3, or a short version of the UE identity is included. That is in message 3' a one-to-one mapping of the UE identity indicated in message 3 is included. The short version of the UE identity can for example correspond to a well-defined number of least significant bits of the full UE identity.

In yet another particular embodiment, if the UE is identified via S-TMSI during random access procedures, the S-TMSI should be both included in message 3 and message 3'.

In still another particular embodiment, if the UE is identified via resume ID during random access procedures (in the RRC resume procedures), the resume ID should be both included in message 3 and message 3'.

In still another embodiment, if the UE is identified via a random number during random access procedures, the same random number should be both included in message 3 and message 3'. That is saying the random number is generated once and included in both message 3 and message 3'.

In another particular embodiment, the size of the payload carried by message 3' is indicated in message 3. The indication in message 3' can be the exact payload size or a range of the payload size based on one or more thresholds. For example, in message 3 it can indicate whether the actual payload size in message 3' is larger or smaller than the allocated TBS in the second UL grant, or the actual payload size is larger or smaller than a predefined threshold X.

In another particular embodiment, the retransmission of message 3 and/or message 3' is not scheduled by using DCI but in a similar way as the random access response (RAR) message. That is instead of directly using a DCI schedule the retransmission of message 3, a DCI used to schedule NPDSCH/PDSCH that carriers the scheduling information (can be dual grants also, e.g., similar as the one in RAR in message 2) for the retransmission of message 3 and/or message 3'.

In another particular embodiment, the number of message 3 retransmissions and message 3' retransmissions are handled independently.

In another particular embodiment, the HARQ feedbacks for the message 3 transmissions and message 3' transmissions are handled independently.

Below, the situation may be considered on a case-by-case bases. In a first case, the UE uses the resource in the first UL grant to transmit message 3, and this message 3 got lost, and the eNB does not detect message 3'. In this scenario, the eNB is not certain whether the UE is using the UL resource indicated by first UL grant only or it uses the resources indicated by both UL grants. And the eNB is not certain whether the UE is capable of using both UL grants or only the first UL grant. Therefore, a number of solutions are disclosed below.

In one particular embodiment, the eNB only schedules the retransmission of message 3 according the once. That is, no dual UL grants are provided to schedule the retransmission of message 3.

In another particular embodiment, the eNB can provide dual UL grants via two DCIs to schedule the retransmission of message 3. There is a one-to-one mapping between the two DCIs to the UL grant(s) the UE chose at the beginning for initial message 3 transmission(s). Thus, the resource indicated in one of the DCIs is used for the retransmission of message 3 if for the initial message 3 transmission at the beginning the UE uses the resource indicated by the first UL grant, and the resource indicated in the other DCI is used for the retransmission of message 3' if for the initial message 3' transmission at the beginning the UE uses the resource indicated by the second UL grant.

In another particular embodiment, two DCIs are scrambled by different RNTIs, and the RNTIs can be provided in the UL grants in the random access response messages. The different RNTIs can either be obtained by partitioning the existing RNTI space (e.g., to reserve some the Temporary C-RNTIs for each of the UL grants) or to define new RNTIs. Or, to only define new RNTIs for the DCI that schedules the retransmission of message 3' where for the initial message 3' transmission at the beginning the UE uses the resource indicated by the second UL grant.

In yet another particular embodiment, the DCI used to schedule the retransmission message 3' is in a different MPDCCH/NPDCCH search space than the one used to schedule the retransmission of message 3.

In another particular embodiment, the configuration of the MPDCCH/NPDCCH search space for the DCI used to schedule the retransmission message 3' is configured related to the search space for the DCI used to schedule the retransmission message 3. A non-exclusive example is that there is an offset of the starting subframe in the search space for the DCI used to schedule the retransmission message 3' with respect to the starting subframe of the search space for the DCI used to schedule the retransmission message 3.

In still another particular embodiment, the configurations of the MPDCCH/NPDCCH search spaces for the DCIs used to schedule the retransmission of message 3 and message 3' is given in the SI, or in the random access response message.

In another particular embodiment, the UE retransmits message 3 if it has not received an acknowledgement or contention resolution message after a period of time. This can be achieved for example by using a timer, which would be started after the first message 3 is transmitted and the UE would retransmit upon the timer expiry. The UE could in this case re-use the previously provided first or second UL grant (depending e.g. on the data size). The used frequency resources can be the same as in the initial grants or then shifted. The time resources provided in the first set of grants map to a later time as the initial transmission was lost. The used timer, possible shift in frequency resources and mapping of time resources can be configured in a cell or per UE (e.g. using RRC protocol and/or based on information in the RAR message) or be fixed in the specifications. In one example the timer is the MAC contention resolution timer disclosed in TS 36.321, but upon timer expiry the UE does not consider the contention resolution not successful and select a new preamble but does a message 3 retransmission instead (this would be a special case for message 3 retransmission with dual grants operation only).

In another particular embodiment, only one DCI is sent by eNB asking for the UE to retransmit message 3. The UE combines information provided in the DCI with the information in the dual grants transmitted during previous step (i.e., in message 2/RAR). In one non-limiting example, this retransmission request DCI provides new time and frequency resources for the UE to use, where the rest of the information is taken from the dual grants sent by the eNB in the previous step. In one example this DCI provides two sets of such time/frequency resource, separately for the first and the second UL grant. In these examples the provided information in the DCI can be some other parameter than time/frequency resource, or a combination of many parameters.

In a second case, the UE uses the resource in the second UL grant to transmit message 3', and this message 3' got lost. In this scenario, presumably the eNB has received the message 3 correctly, and the message 3 indicates the UE also uses the $2^{nd}$ UL grant for message 3'. Therefore, the eNB only needs to provide UL grant for message 3'.

In a particular embodiment, if the eNB identifies message 3' got lost, the eNB does not need to provide grant for retransmit both message 3 and message 3'. But the eNB only needs to grant an UL resource to indicate the retransmission of the message 3'.

In a particular embodiment, the retransmission of message 3' is indicated via DCI, and there is one field in the DCI that indicates this DCI is not used for retransmission of message 3.

In a particular embodiment, the DCI used to schedule the retransmission of message 3' is scrambled with a different RNTI than the one used to scramble the DCI which is used to schedule the retransmission of message 3.

In a particular embodiment, the RNTI is sent in the random access response message.

In a particular embodiment, the DCI used to schedule the retransmission message 3' is in a different MPDCCH/NPDCCH search space than the one that schedule the retransmission of message 3.

In a particular embodiment, the configuration of the MPDCCH/NPDCCH search space for the DCI used to schedule the retransmission message 3' is configured is related to the search space for the DCI used to schedule the retransmission message 3. A non-exclusive example is that there is an offset of the starting subframe in the search space for the DCI used to schedule the retransmission message 3' with respect to the starting subframe of the search space for the DCI used to schedule the retransmission message 3.

In a particular embodiment, the configurations of the MPDCCH/NPDCCH search spaces for the DCIs used to schedule the retransmission of message 3 and message 3' is given in the SI, or in the random access response message.

A timer-based solution, like the one described above for the first cases (first instance) 1 (second instance) could also be possible, but if there is no feedback (i.e. no new grant) from the eNB, the UE cannot know if the message 3 transmission has gone through or not. In this scenario, similar to as described above, a retransmission may be scheduled by the UE after a certain time period has passed, where the UE would retransmit message 3 (even the eNB already received it). In an alternative embodiment, the eNB may send an acknowledgement to the UE it has received message 3, but not for message 3', thus the UE could retransmit message 3' instead. For message 3' there could be a similar but separate retransmission timer as for message 3.

In a third case, the eNB detects the UE uses the resource in the first UL grant to transmit message 3, but this message 3 cannot be decoded correctly and the eNB does not detect message 3'. The solution in this scenario is the same as that for the first case, described above.

In a fourth case, the eNB detects the UE uses the resource in the second UL grant to transmit message 3', and this message 3' cannot be decoded correctly. The solution in this scenario is the same as that for the second case, described above.

In a fifth case, the eNB detects the UE uses the resource in both the first and the second UL grant to transmit message 3 and message 3', and neither message 3 nor message 3' can be decoded correctly. In this scenario, the eNB can assume that the UE is capable of early data transmission, i.e., using message 3' to send larger payload together with message 3. The solutions outlined in 1 can be adopted in this case, and the eNB can simply provide a large enough grant that can be used to retransmit both message 3 and message 3'.

In a particular embodiment, the eNB may allocate UL resources that can be used for the retransmission of both message 3 and message 3'.

In another particular embodiment, in the DCI, there is a field to indicate whether the DCI is to allocate the UL resource for the retransmission of message 3 or message 3' or both at the same time.

In another particular embodiment, in the DCI, it is implicitly indicated that whether the DCI is to allocate the UL resource for the retransmission of message 3 or message 3' or both at the same time. One non-exclusive example is to use one of the used values (or a combination) in the MCS and/or TBS to indicate this.

In another particular embodiment, the network can indicate of partial of message 3' is retransmitted together with message 3, e.g., by providing a TBS that is larger than the one used by message 3, but smaller to accommodate all the payload in the original message 3'.

In particular embodiments, a timer-based solution may be adopted, as described above. Thus, the UE may retransmit message 3 and message 3' after a period of time has passed. In a particular embodiment, only one timer common to both messages may be used, where expiry would trigger retransmission of both message 3 and message 3'. In another embodiment, there may be a separate timer for each of the messages controlling the retransmissions separately.

Figure 6:
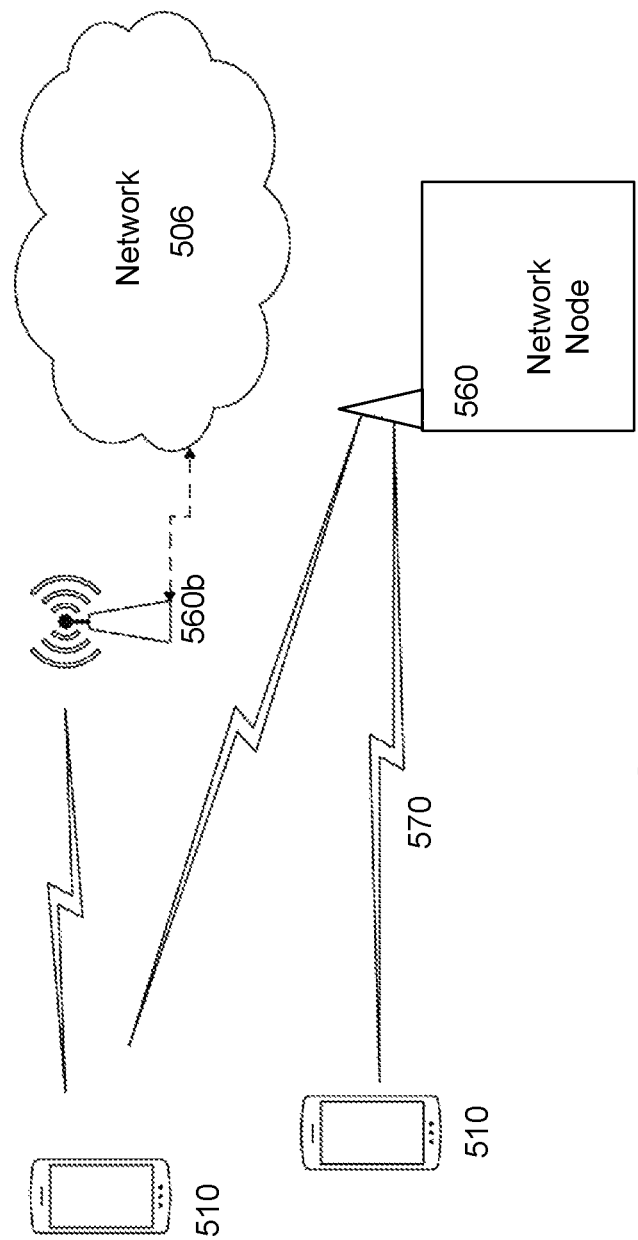
FIG. 6 illustrates an example wireless network, according to certain embodiments.

FIG. 6 illustrates a wireless network, according to certain embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 7:
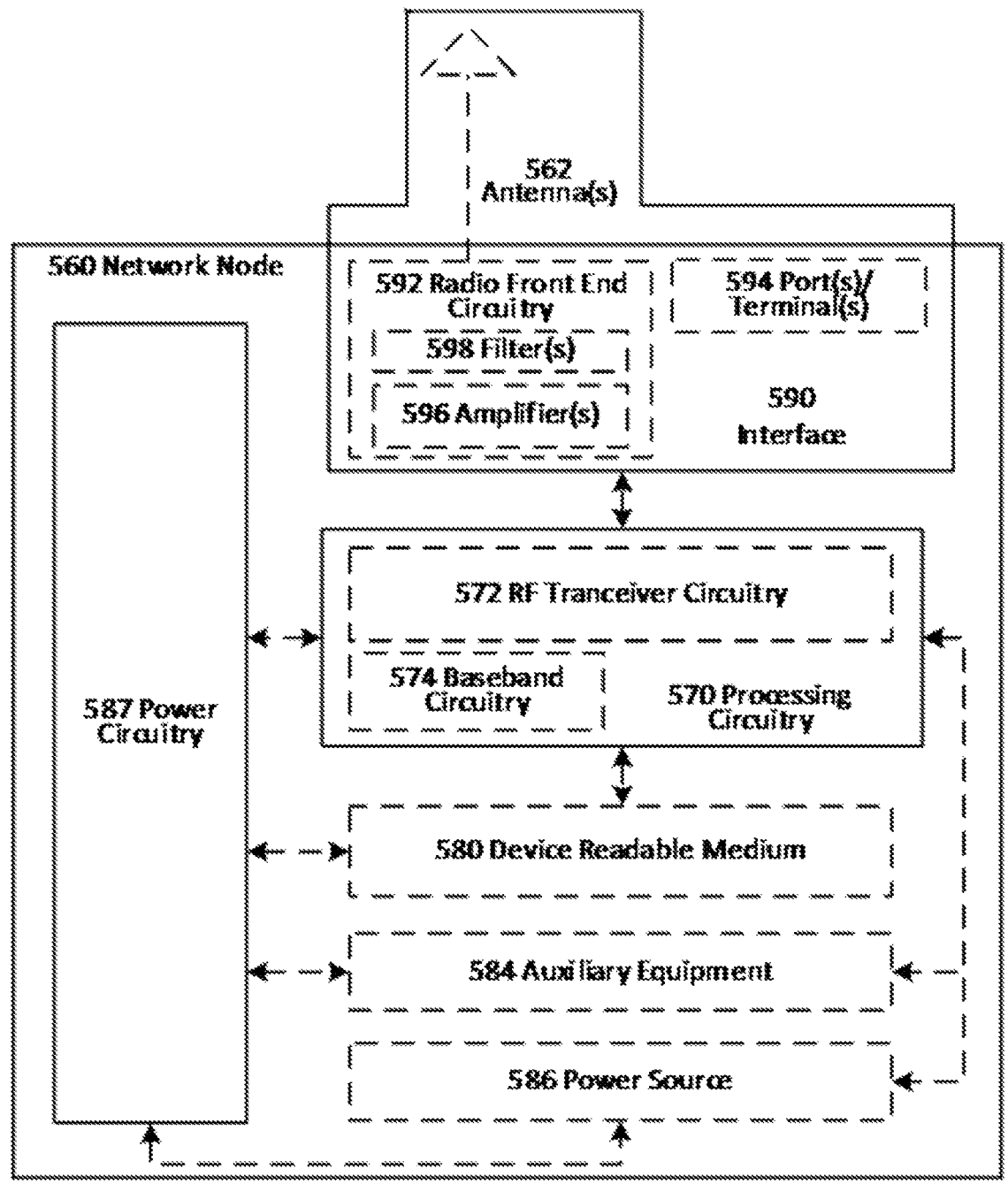
FIG. 7 illustrates an example network node, according to certain embodiments.

FIG. 7 illustrates a network node 560, according to certain embodiments. As depicted in FIG. 7, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units.

In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560 but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 7 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Figure 8:
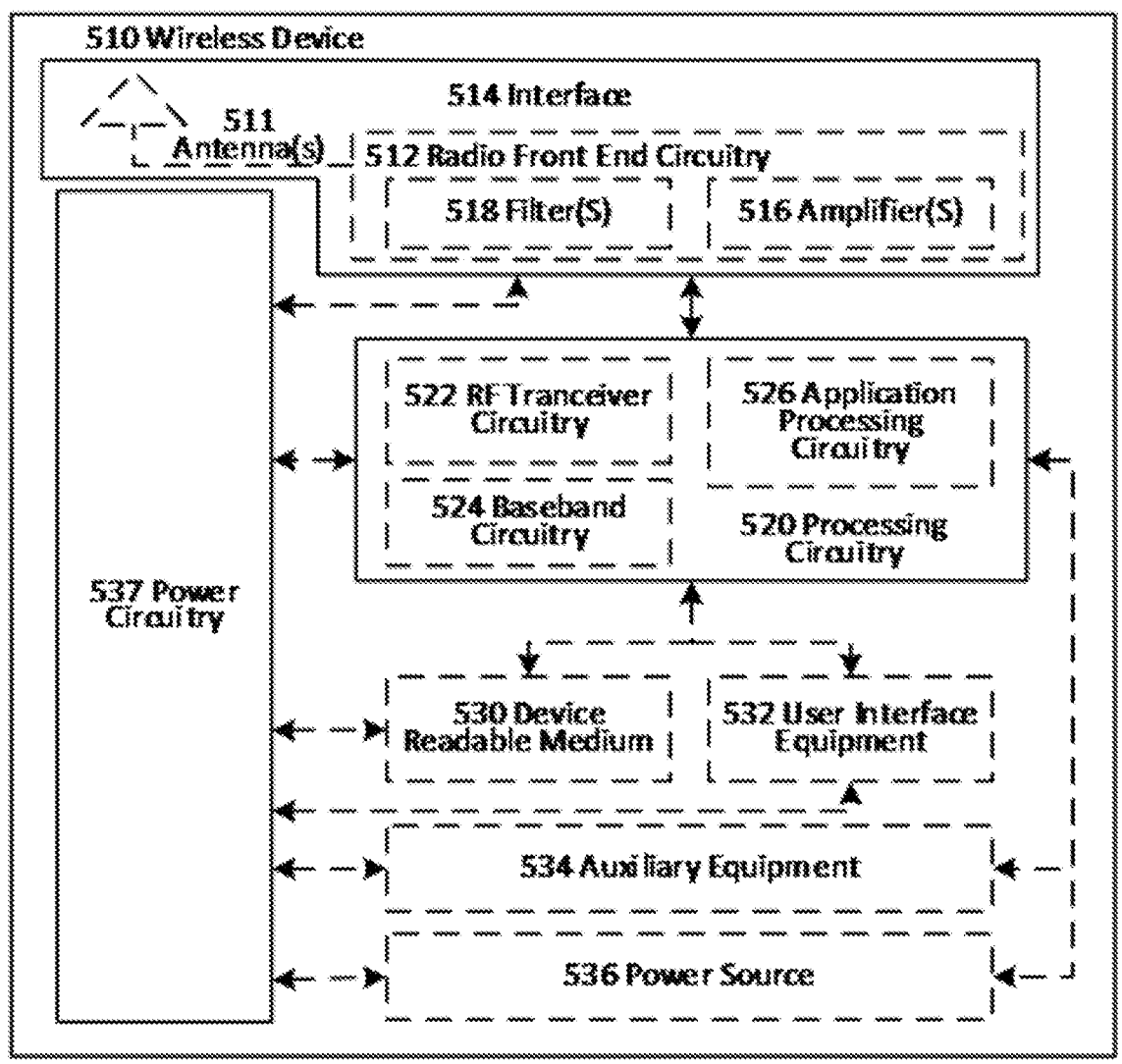
FIG. 8 illustrates an example wireless device, according to certain embodiments.

FIG. 8 illustrates an example wireless device, according to certain embodiments. As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520 and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510 and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Alternative embodiments of WD 510 may include additional components beyond those shown in FIG. 8 that may be responsible for providing certain aspects of the WD's functionality, including any of the functionality described herein and/or any functionality necessary to support the subject matter described herein. For example, WD 510 may include user interface equipment to allow input of information into WD 510 and to allow output of information from WD 510.

Figure 9:
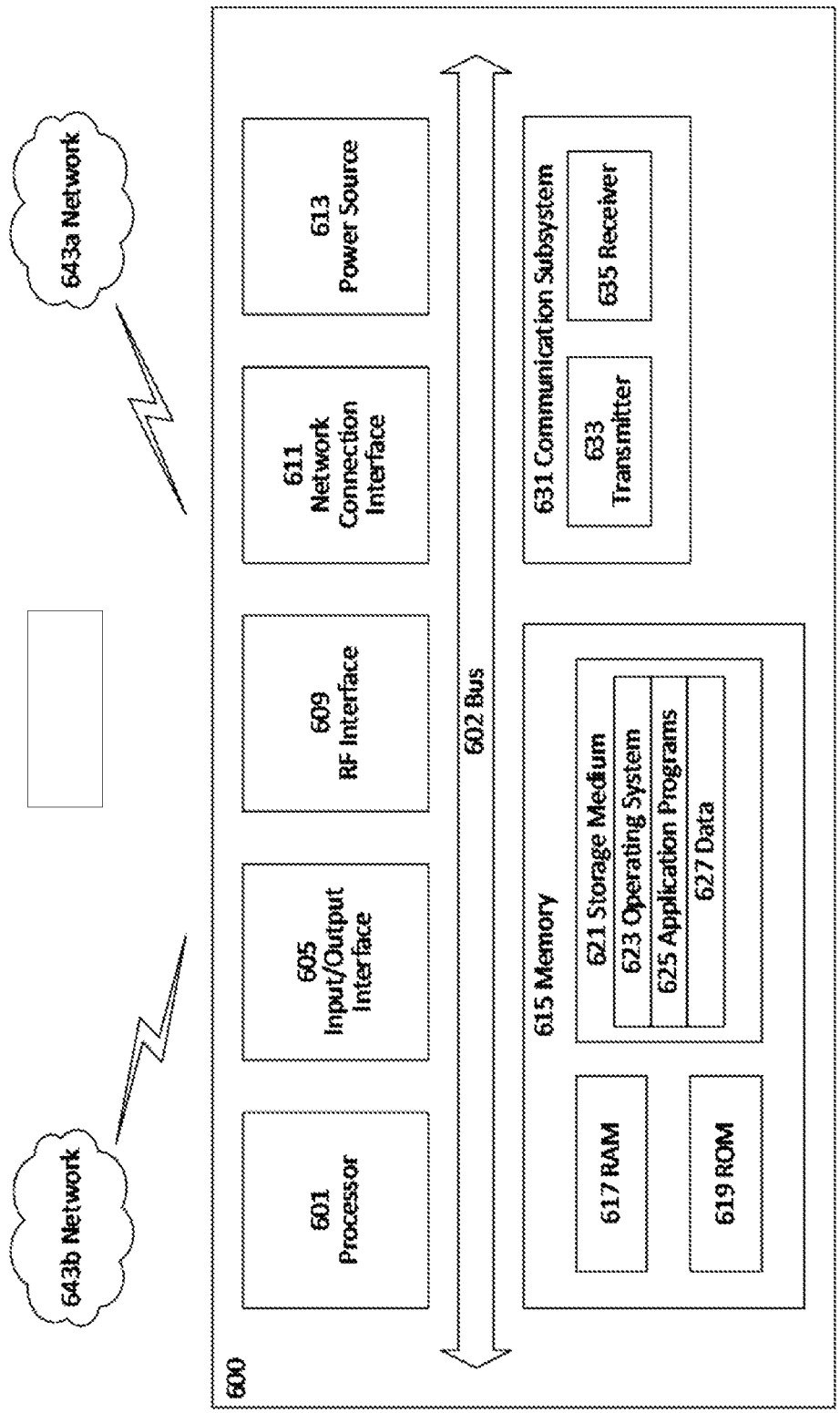
FIG. 9 illustrates an example UE, according to certain embodiments.

FIG. 9 illustrates an example UE 600, according to certain embodiments. As used herein, a user equipment or UE 600 may not necessarily have a user in the sense of a human user who owns and/or operates the relevant device. Instead, a UE 600 may represent a device that is intended for sale to, or operation by, a human user but which may not, or which may not initially, be associated with a specific human user (e.g., a smart sprinkler controller). Alternatively, a UE 600 may represent a device that is not intended for sale to, or operation by, an end user but which may be associated with or operated for the benefit of a user (e.g., a smart power meter). UE 600 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 9, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.6, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 10:
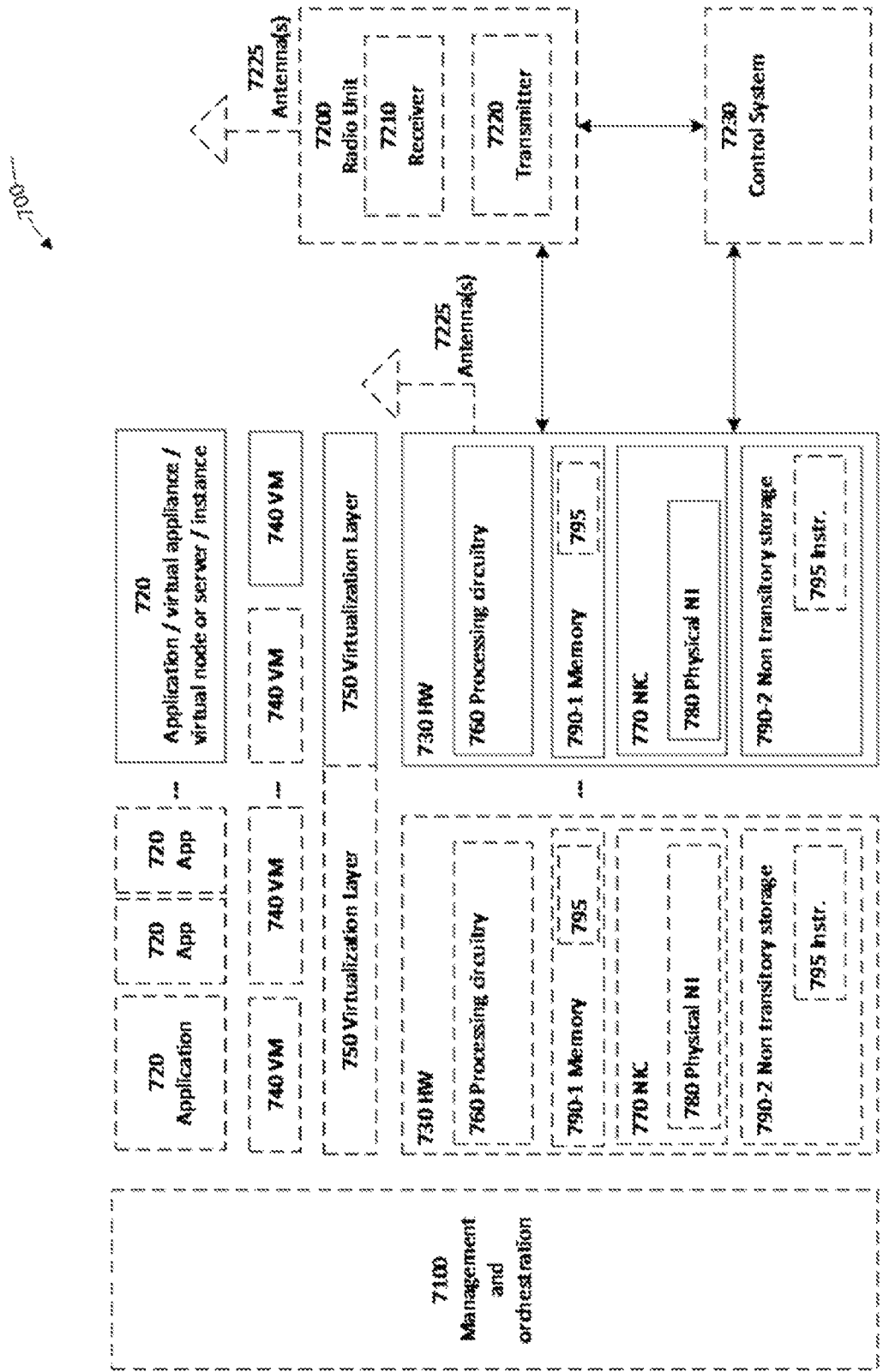
FIG. 10 illustrates an example virtualization environment in which functions implemented by some embodiments may be virtualized, according to certain embodiments.

FIG. 10 illustrates an example virtualization environment 700 in which functions implemented by some embodiments may be virtualized, according to certain embodiments. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 10, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 10.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be affected with the use of control system 7230 which may alternatively be used for communication between the hardware nodes 730 and radio units 7200.

Figure 11:
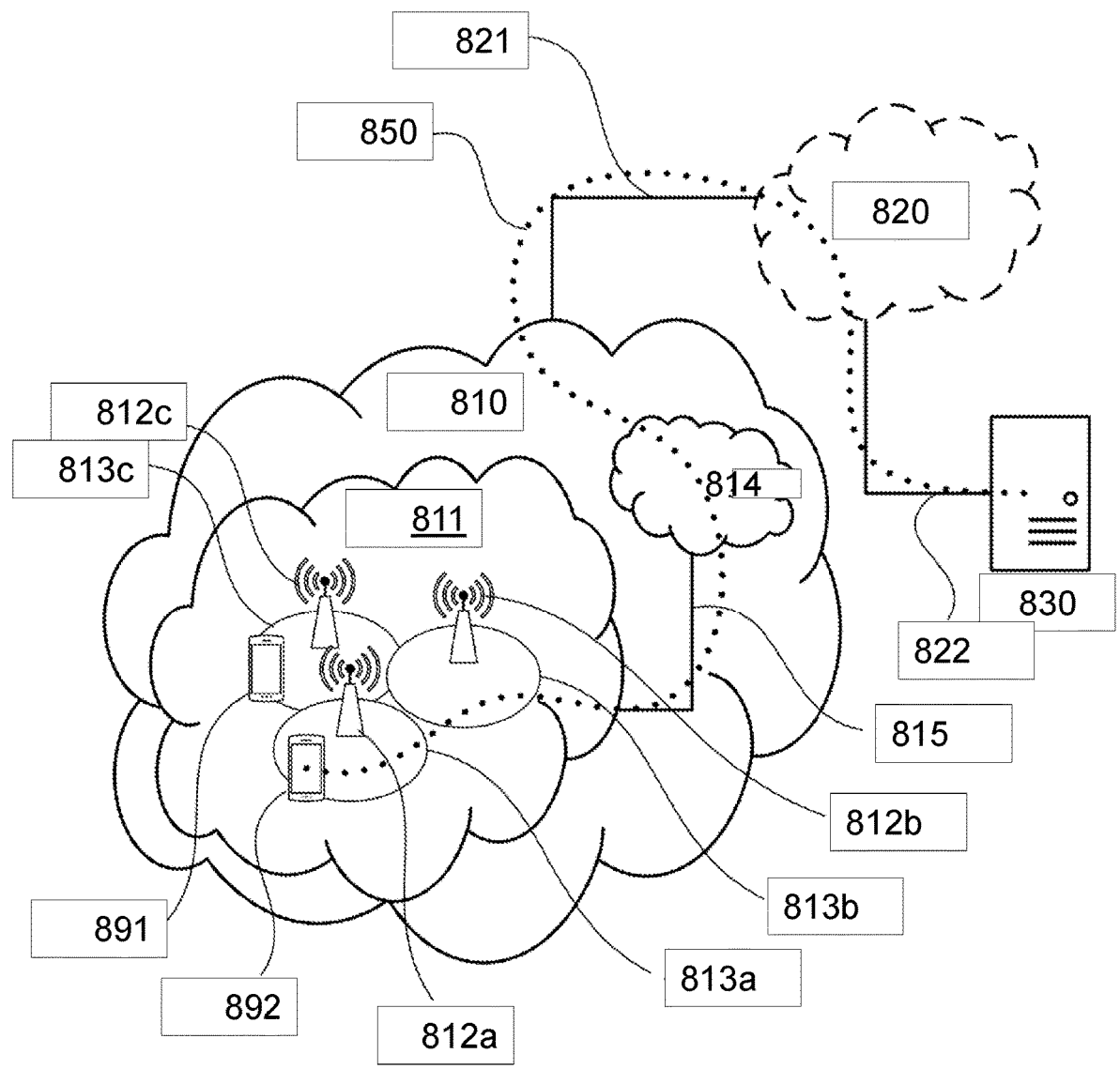
FIG. 11 illustrates a telecommunication network connected via an intermediate network to a host computer, according to certain embodiments.

FIG. 11 illustrates a telecommunication network connected via an intermediate network to a host computer, according to certain embodiments. As depicted, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 12:
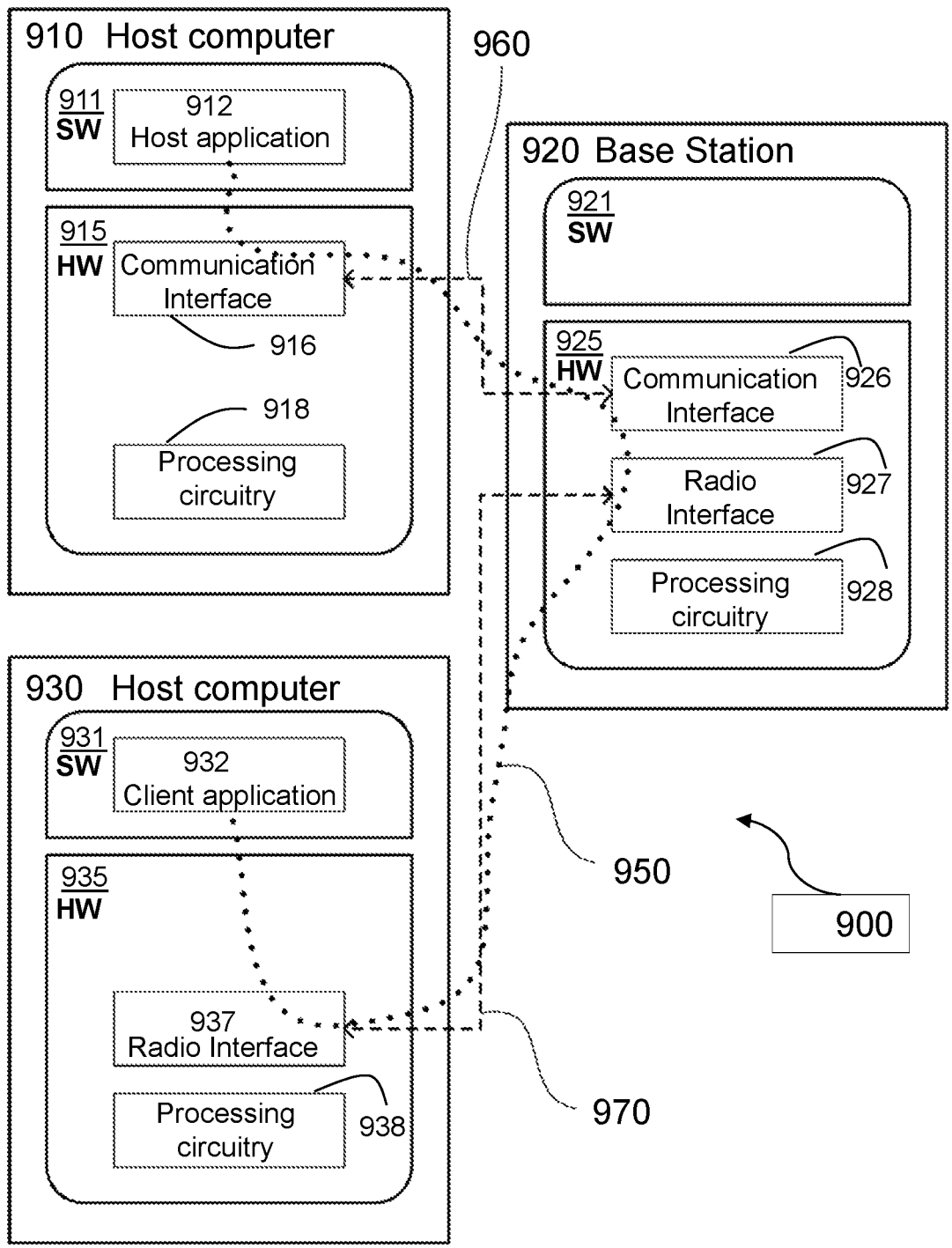
FIG. 12 illustrates a host computer communicating via a base station with a user equipment over a partially wireless connection, according to certain embodiments.

FIG. 12 illustrates a host computer communicating via a base station with a user equipment over a partially wireless connection, according to certain embodiments. Example implementations, in accordance with an embodiment, of the UE, base station and host computer discussed in the preceding paragraphs are described with reference to FIG. 12. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct, or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 12 may be similar or identical to host computer 830, one of base stations 812a, 812b, 812c and one of UEs 891, 892 of FIG. 11, respectively. This is to say, the inner workings of these entities may be as shown in FIG. 12 and independently, the surrounding network topology may be that of FIG. 11.

In FIG. 12, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the use of radio resources and thereby provide benefits such as improved responsiveness, lower latency, reduced data usage.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figures 13, 14:
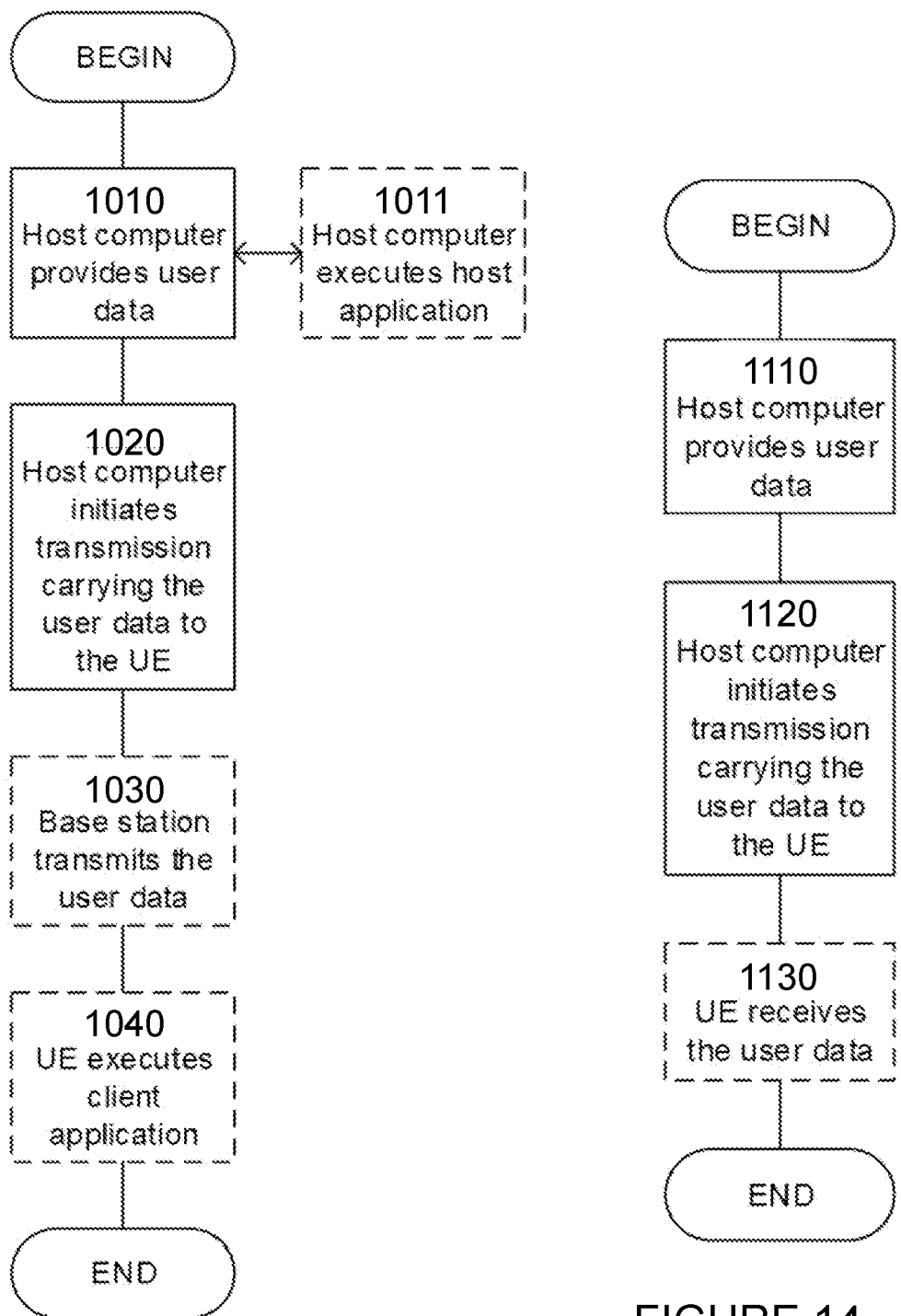
FIG. 13 illustrates an example method implemented in a communication system, according to certain embodiments.
FIG. 14 illustrates another example method implemented in a communication system, according to certain embodiments.

FIG. 13 is a flowchart illustrating an example method implemented in a communication system, according to certain embodiments. The communication system includes a host computer, a base station and a UE which may be those described with reference to FIGS. 11 and 12. For simplicity of the present disclosure, only drawing references to FIG. 13 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 14 is a flowchart illustrating another example method implemented in a communication system, according to certain embodiments. The communication system includes a host computer, a base station and a UE which may be those described with reference to FIGS. 11 and 12. For simplicity of the present disclosure, only drawing references to FIG. 14 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figures 15, 16:
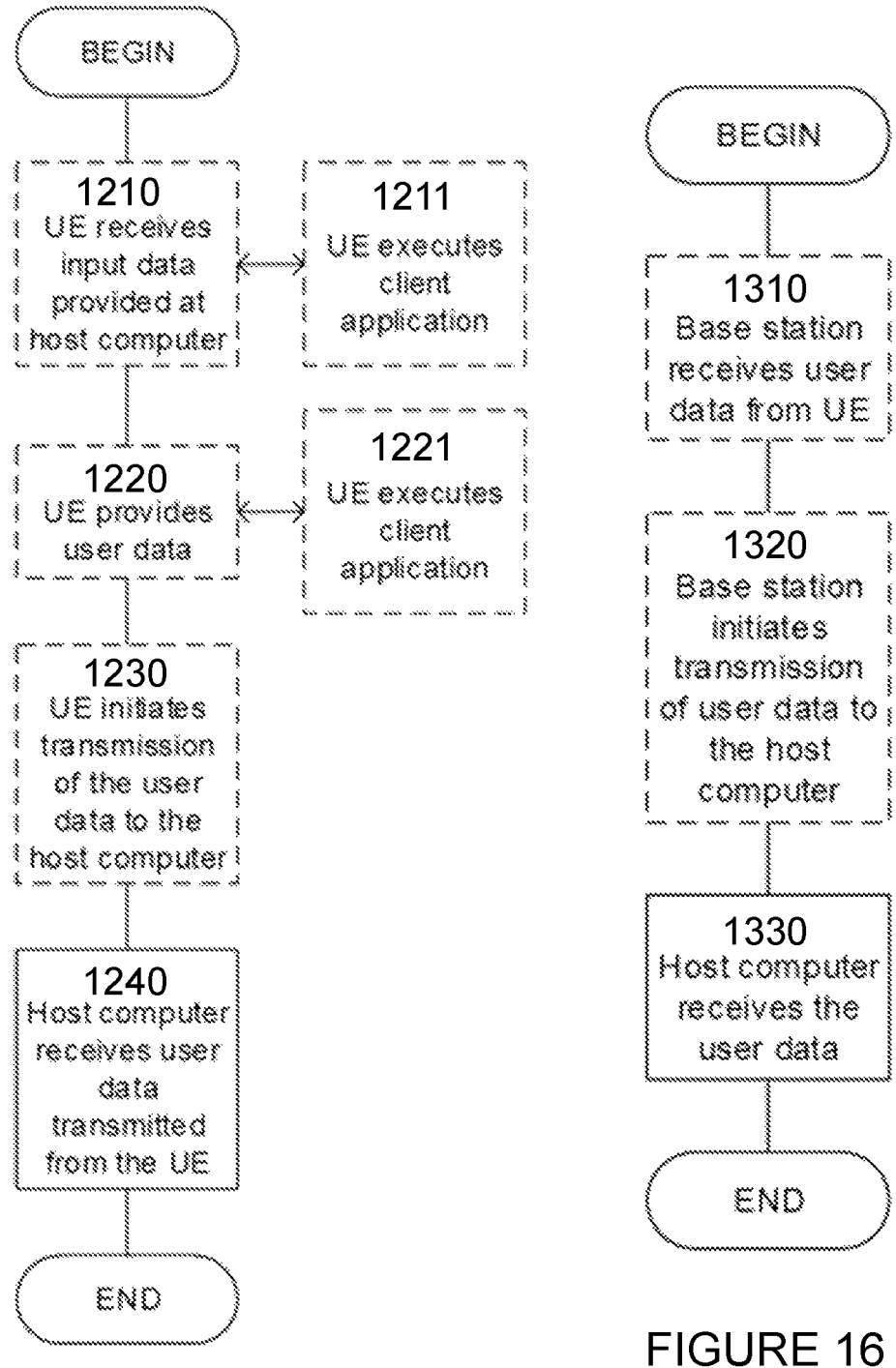
FIG. 15 illustrates another example method implemented in a communication system, according to certain embodiments.
FIG. 16 illustrates another example method implemented in a communication system, according to certain embodiments.

FIG. 15 is a flowchart illustrating another example method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1210 (which may be optional), the UE receives input data provided by the host computer. Additionally, or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 16 is a flowchart illustrating another example method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
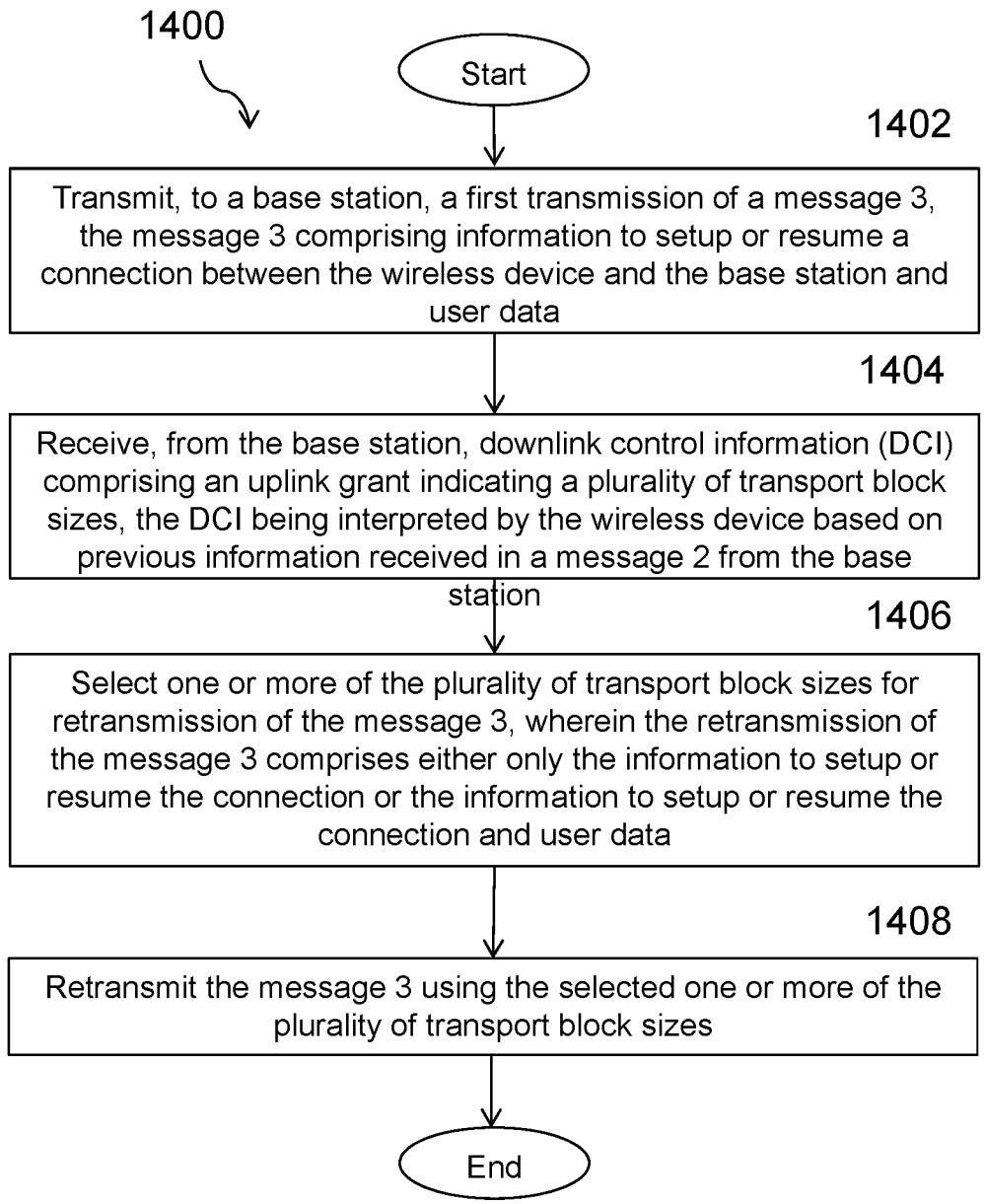
FIG. 17 illustrates a method by a wireless device for retransmitting message 3, according to certain embodiments.

FIG. 17 illustrates a method by a wireless device 510 for retransmitting message 3, according to certain embodiments. In a particular embodiment, WD 510 may include a UE 600. The method begins at step 1402 when the wireless device 510 transmits, to network node 560 such as a base station, a first transmission of a message 3, the message 3 comprising information to setup or resume a connection between the wireless device 510 and the base station 560 and user data.

In a particular embodiment, the message 3 includes a radio resource control (RRC) connection request or an RRC connection resume request or RRC connection re-establishment request.

In a particular embodiment, the first transmission of the message 3 is transmitted using the selected one or more of the plurality of transport block sizes.

In a particular embodiment, the first transmission of the message 3 is transmitted using a one of the plurality of transport block sizes that is different from the selected one or more of the plurality of transport block sizes used for the retransmission of the message 3.

At step 1404, wireless device 510 receives, from base station 560, downlink control information (DCI) comprising an uplink grant indicating a plurality of transport block sizes. The DCI is interpreted by wireless device 510 based on previous information received in a message 2 from base station 560.

In a particular embodiment, the message 2 includes a random access response message comprising the plurality of transport block sizes allocated to the wireless device for the first transmission of the message 3.

In a particular embodiment, the DCI may include at least a time resource and a frequency resource for each one of the plurality of transport block sizes.

In a particular embodiment, the DCI may include at least one of a time resource and a frequency resource for use in the retransmission of the message 3. In a particular embodiment, the at least one of the time resource and the frequency resource for use in the retransmission of the message 3 has an identical size to at least one of a time resource and a frequency resource used for the first transmission of the message 3. In another embodiment, the at least one of the time resource and the frequency resource for use in the retransmission of the message 3 has a different size from at least one of a time resource and a frequency resource used for the first transmission of the message 3. In still another particular embodiment, the at least one of the time resource and the frequency resource for use in the retransmission of the message 3 is shifted from at least one of a time resource and a frequency resource used for the first transmission of the message 3.

At step 1406, wireless device 510 selects one or more of the plurality of transport block sizes for retransmission of the message 3. The retransmission of the message 3 includes either (1) only the information to setup or resume the connection or (2) the information to setup or resume the connection and user data to be sent to the base station.

At step 1408, wireless device 510 retransmits the message 3 using the selected one or more of the plurality of transport block sizes.

In a particular embodiment, the method may further include wireless device 510 receiving, from base station 560, a message 4 comprising a contention resolution message completing the connection between wireless device 510 and base station 560. The message 4 may be received after the retransmission of the message 3.

In a particular embodiment, the method may further include the wireless device 510 starting a timer associated with the first transmission of a message 3, determining that the timer has expired prior to receiving an acknowledgment from the base station indicating that the base station received the first transmission of the message, and sending the retransmission of the message 3 in response to determining that the timer has expired prior to receiving an acknowledgment from the base station.

Figure 18:
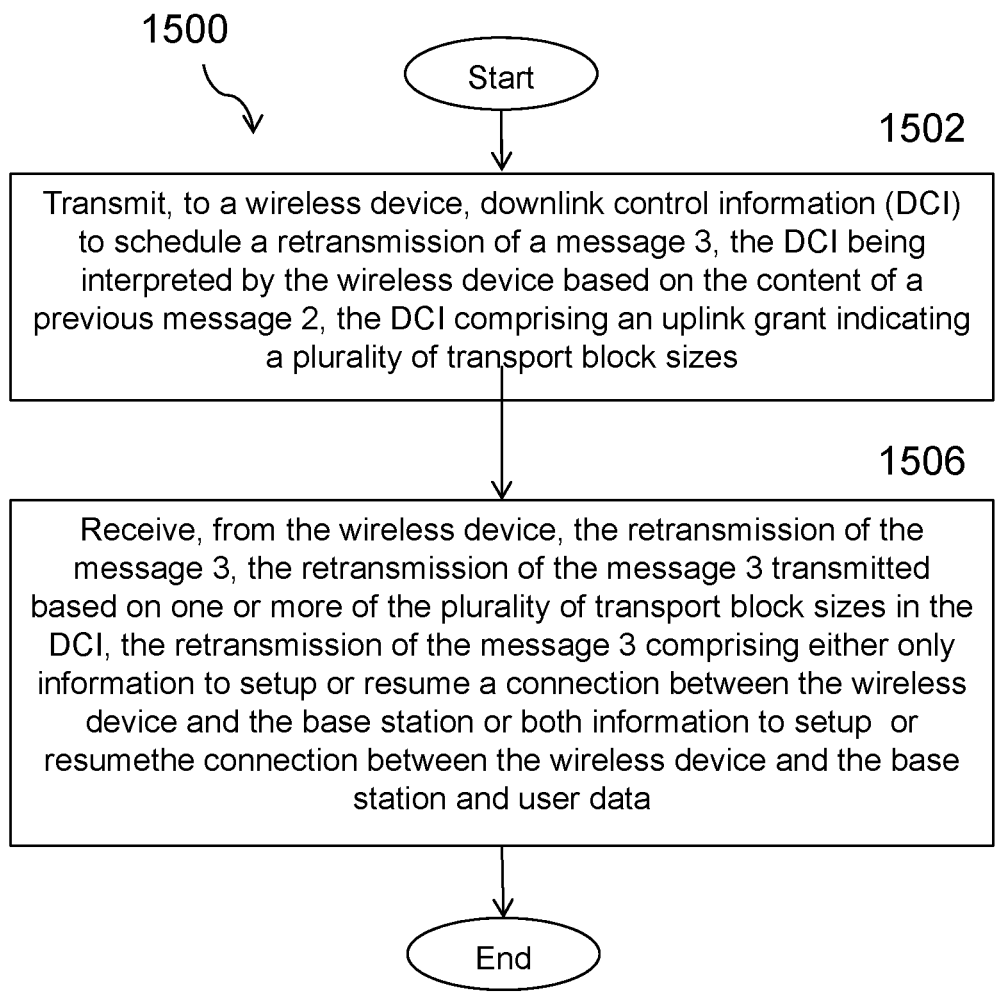
FIG. 18 illustrates a method by network node for receiving a message 3, according to certain embodiments.

FIG. 18 illustrates a method by network node 560, such as a base station, for receiving a message 3, according to certain embodiments. The method begins at step 1502 when base station 560 transmits, to a wireless device 510, DCI to schedule a retransmission of a message 3. The DCI includes an uplink grant indicating a plurality of transport block sizes and is interpreted by wireless device 510 based on the content of previous message 2.

In a particular embodiment, the message 3 includes a RRC connection setup request or an RRC connection resume request or RRC connection re-establishment request.

In a particular embodiment, the DCI comprises at least a time resource and a frequency resource for each one of the plurality of transport block sizes.

In a particular embodiment, the DCI comprises at least one of a time resource and a frequency resource for use in the retransmission of the message 3. In a particular embodiment, the at least one of the time resource and the frequency resource for use in the retransmission of the message 3 has an identical size to at least one of a time resource and a frequency resource used for an initial transmission of the message 3. In another embodiment, the at least one of the time resource and the frequency resource for use in the retransmission of the message 3 has a different size from at least one of a time resource and a frequency resource used for an initial transmission of the message 3. In still another embodiment, the at least one of the time resource and the frequency resource for use in the retransmission of the message 3 is shifted from at least one of a time resource and a frequency resource used for the initial transmission of the message 3.

At step 1504, base station 560 receives, from wireless device 510, the retransmission of the message 3 that is transmitted based on one or more of the plurality of transport block sizes in the DCI. The retransmission of the message 3 includes either (1) only information to set up or resume a connection between wireless device 510 and base station 560 or (2) both information to setup or resume the connection between wireless device 510 and base station 560 and user data.

In a particular embodiment, the method further includes base station 560 transmitting, to wireless device 510, the message 2. The message 2 may include a random access response message that includes a plurality of transport block sizes allocated to wireless device 510 for the first transmission of the message 3.

In a particular embodiment, the method further includes base station 560 transmitting, to wireless device 510, a message 4 that includes a contention resolution message completing the connection between wireless device 510 and base station 560. The message 4 may be transmitted after the retransmission of the message 3 is received.

In a particular embodiment, prior to transmitting the DCI to schedule the retransmission of the message 3, base station 560 may receive an initial transmission of the message 3 and determine that at least a portion of the initial transmission of the message 3 cannot be decoded.

Additional Information

At RAN #75 it was agreed to start the Release 15 work item on Even further enhanced MTC for LTE. In this paper we address the objective on "Support early data transmission" [RP-170732, "Even further enhanced MTC for LTE", RAN #75, Ericsson, Qualcomm]:

Support early data transmission [RAN2 lead, RAN1, RAN3]

Evaluate power consumption/latency gain and specify necessary support for DL/UL data transmission on a dedicated resource during the Random Access procedure (after PRACH transmission and before the RRC connection setup is completed) at least in the RRC Suspend/Resume case.

It is possible to support early data transmission for both Mobile Originating (MO) and Mobile Terminating (MT) events. The focus of this disclosure is on RRC Resume procedure, although the discussion provided is largely agnostic to the actual used RRC procedure. Results based on analytical calculation and simulations on the achievable gain when using "early data" transmission vs sending the data using Rel-13 RRC Resume procedure are provided.

Currently, especially when sending small data such as few bytes sensor reports or similar, the amount of overhead is relatively high due to random access and RRC signalling. This is still the case even with recent EPS CIoT optimizations for user plane and control plane (i.e., RRC Suspend/Resume and Data over NAS procedures).

shows an example of RRC Suspend/Resume procedure for MO traffic case for an eMTC UE. For the UE to send UL data, it needs to go through sync acquisition, MIB and at least SIB1-BR acquisition, random access up to Message 4 (e.g. RRC Connection Resume) after which the UE can send the actual UL data.

Similar situation would occur with MT data, where DL data can be sent after the eNB has received the RRC Connection Resume Complete message.

If this sequence would be shorter, the UE would benefit in latency. If either UL or DL could be sent earlier, the latency starting from either the triggered MO or MT event up to the delivery of the data packet to higher layers in eNB or UE.

The UE would also benefit in power consumption. By reducing the steps needed to send UL or DL data, the UE can save cycles in MPDCCH monitoring and signalling reception and transmission.

Figure 19:
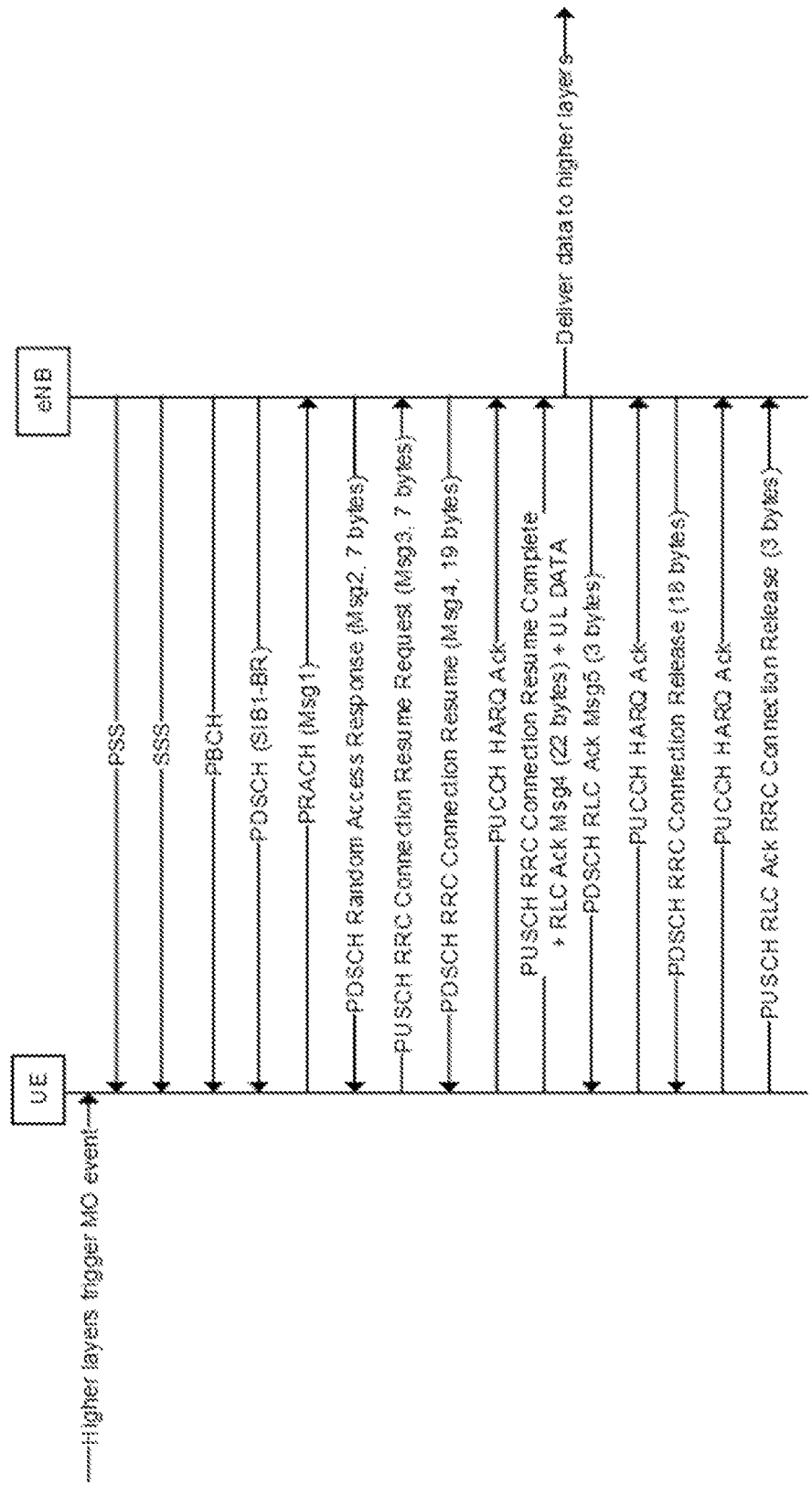
FIG. 19 illustrates example of signalling for uplink data transmission in Msg5 using RRC suspend/resume (User plane CIoT EPS optimization).

FIG. 19 illustrates example of signalling for uplink data transmission in Msg5 using RRC suspend/resume (User plane CIoT EPS optimization).

A first observation may be that early data transmission possibility for UL and/or DL data results in improvements in latency and UE power consumption.

With regard to early data in UL, compared to doing the "full" RRC connection setup procedure as defined in Rel-8, in Rel-13 optimizations to support earlier data transmission were specified. Solution using user plane transmission is called User plane CIoT EPS optimizations, which from RRC perspective means using RRC Suspend/Resume procedures. For control plane, the solution is called Control plane CIoT EPS optimizations or Data-over-NAS (DoNAS), where from RRC perspective the data contained in NAS-PDU, which is then piggybacked to a RRC message.

shows the example signalling for RRC suspend/resume case.

With regard to early data in Msg1, one could consider sending data already in Msg1. The main argument against this is uplink timing and transmission power: Without proper timing a message transmission will likely fail resulting in no benefit but additional interference in the cell. To solve the uplink timing issue, new formats should be designed for PRACH channel which would take payload transmission into account, e.g. by introducing longer cyclic prefixes.

LTE was not designed to support Msg1 payload transmissions, and we do not think this is a viable way forward for early data transmission. Moreover, sending data together with the PRACH preamble is excluded in the WID, as disclosed in RP-170732, "Even further enhanced MTC for LTE", RAN #75, Ericsson, Qualcomm.

A first observation may be that sending data in Msg1 is not within the scope of the WID.

With regard to early data in Message 3, the remaining alternative is to look into transmission of early data in Message 3, that is, together with RRC Connection Resume Request or RRC Connection Request. In R2-1708630, "Bearer Setup and Security Considerations for Early Data in MTC", RAN2 #99, source Ericsson, security aspects of early data transmission in Message 3 are discussed, a solution is presented to restore suspended DRB(s) and respective PDCP entities with new keys derived before passing RRC Connection Resume Request to lower layers. This way, data could be ciphered and multiplexed with RRC Connection Resume Request in Message 3 in MAC layer.

In principle, the eNB does not know the UE identity nor its supported capabilities, before Message 3 transmission. There are two aspects an early data procedure should achieve:
1. Indicate to the UE the possibility to send early data (in Message 3)
2. Provide information on the resources to send the early data (i.e. a larger UL grant) One way to keep backwards compatibility is to use existing signalling and embed any necessary information needed for early data in Random Access Response message (RAR). Both of the above aspects can be handled in RAR alone, or then just the indication part alone and the grant would be sent separately.

For example, support for early data could be indicated using R-bit(s) in MAC subheader or RAR message. The early data grant information could be either derived from the information of the legacy grant included in RAR, for example, by configuring an offset to TBS to provide larger grants for supporting UEs, or then a new RAR or grant could be included in the padding region of the RAR message. The second grant should re-use as much information from the first grant as possible, for example timing advance is the same so there is no need to include it twice.

This way the eNB does not need exact information of the UE capabilities, but would provide "dual grant" in RAR, where legacy UEs act according to pre-Rel-15 procedure and UEs supporting early data could use the (larger) grants provided for multiplexing data with RRC Connection Resume Request. It would be up to UEs supporting the early data feature to select the legacy grant or a larger grant for early data.

A first observation may be that indication of early data opportunity and larger grants for early data in Message 3 can be provided in a backwards-compatible way.

A second observation may be that backwards compatibility can be kept by embedding additional grant information in RAR.

As the results show later is this document, there are considerable power consumption and latency gains to be achieved when transmitting uplink data in Message 3 compared to transmissions in Msg5 or later. Based on this and the above discussion we think a viable way forward for RAN2 is to continue discussion on the details how early data in Message 3 can be specified in backwards-compatible manner.

According to a first proposal, RAN2 should specify support for early data transmission in Message 3.

According to a second proposal, an additional grant is provided in RAR for early transmission in Message 3.

Figure 20:
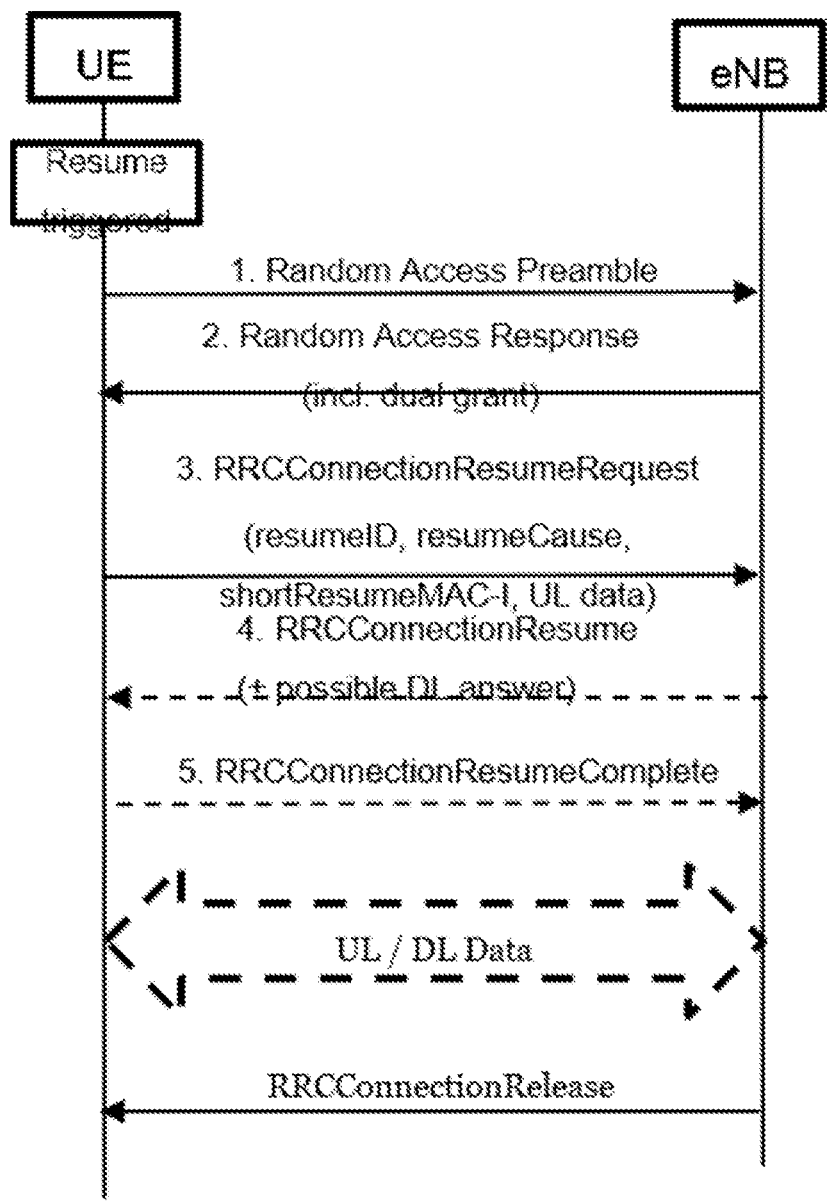
FIG. 20 illustrates early UL data in Message 3 using RRC Resume.

FIG. 20 illustrates early UL data in Message 3 using RRC Resume. Specifically, FIG. 20 shows the message flow for early data in Message 3 together with RRCConnectionResumeRequest, with possible further UL/DL data transmissions. For more details on the RRC procedures and security details, see R2-1708630, "Bearer Setup and Security Considerations for Early Data in MTC", RAN2 #99, source Ericsson. Early data transmission in Message 3 vs data transmission in Msg5

With regard to power consumption, in the table illustrated in FIG. 22 and the table illustrated in FIG. 23, results of comparing transmitting data during (early data) and after RRC Resume procedure according to reference performance framework are presented. The comparison is made between early data like in FIG. 20 to RRC resume as shown in FIG. 19. The UE goes to PSM in between the MO events. It is further assumed the UE is released to idle mode as soon as possible after the DL packet has been received. The UE stays 10 s waiting for possible paging (PSM active timer) until it goes to PSM and deep sleep.

Specifically FIG. 22 illustrates results for early data transmission in Message 3 and Message 4 (MO event). FIG. 23 illustrates results for early data in Message 4 (MT event).

The coverage level significantly impacts the gains both in absolute and relative terms. The larger the coverage, the more gain one can achieve with early data with respect to legacy RRC resume and suspend. The operation mode has clearer impact on the performance gains in poor coverage level, e.g., 164 dB MCL.

Results are dependent on assumed traffic model and power consumption levels. For 24 hour reporting interval the battery life exceeds 10 years with early data in Message 3, when assuming the "worst" model, i.e. 200 bytes UL and 65 bytes DL packets With smaller data size the results are better. Latency

| UL report latency (ms) | | | | | | | | | |
|---|---|---|---|---|---|---|---|---|---|
| UL Packet | 144 dB MCL | | | 154 dB MCL | | | 164 dB MCL (PUSCH HARQ) | | |
| size (byte) | Resume | Early | Gain (%) | Resume | Early | Gain (%) | Resume | Early | Gain (%) |
| 20 | 197 | 180 | 8.63% | 435 | 295 | 32.18% | 4779 | 3720 | 22.16% |
| 50 | 201 | 184 | 8.46% | 501 | 360 | 28.14% | 5882 | 4686 | 20.33% |
| 200 | 223 | 205 | 8.07% | 853 | 702 | 17.70% | 10461 | 9265 | 11.43% |

For the extended coverage cases, the early data for MO events can result in substantial gains, up to one second reduction in the latency for the 164 MCL. Relative gains are even better for the medium coverage (154 dB) case, where the absolute gain naturally is not as large.

Early Data in DL

With regard to early data in Message 2, for MT events, where the UE does not have uplink data to send but the network instead is triggered to deliver data to the UE, the first alternative to consider is to send data already in Message 2 after the UE has been paged.

For UEs starting in idle mode, unless the preamble the UE uses is reserved for indicating early data, the eNB would not know UE ID at this stage. Also, it is not clear how the user data would be ciphered if in RAR, and the RAR message can be received by multiple UEs. The cost of reserving resources for early data transmission in Message 2 for example by using preamble space partition and changing the RAR reception principles may not be worth the possible achieved gain for this use case. For these reasons, specifying early data in Message 2 for UEs may not be worth considering.

Early data in Message 2 is not specified.

With regard to early data transmission in Message 4, the remaining alternative is to look for DL early data in Message 4. From RAN2 perspective we should make it possible for the eNB to send ciphered DL data in Message 4. The solution for the Message 4 case is the same as for Message 3 UL early data, as discussed above, that is, restore DRBs and respective PDCP entities already before Message 3 transmission.

A first observation may be that, from a security perspective, DL data multiplexed with RRC Connection Resume in Message 4 is ciphered with the same solution as early data transmission in Message 3.

A first proposal may be that details for early data transmission support for MT data in Message 4 may be specified. Note that there is a difference in where the first DL data are sent between the UL and DL triggered case: For DL triggered or MT traffic case the DL data can be sent in Message 4, but in the UL triggered case it might not be possible to send possible DL answer to UL data back in Message 4 if there is considerable delay (such as 1000 ms as used in some models. In this case the DL answer to UL triggered data transmission would be sent in a later message after Message 4.

With regard to gains of early data in Message 4, the table in FIG. 24 is provided. FIG. 24 summarizes the results of downlink transmission only (Message 4).

As for MO early data transmission, also transmission of MT data in Message 4 show significant relative gains as shown in FIG. 24. The exact gains heavily depend on the used traffic model, and the gains decrease with increasing interarrival time and/or better UE coverage.

In conclusion, the following may be observed:

Observation 1 Early data transmission possibility for UL and/or DL data results in improvements in latency and UE power consumption.

Observation 2 Sending data in Msg1 is not within the scope of the WID.

Observation 3 Indication of early data opportunity and larger grants for early data in Message 3 can be provided in a backwards-compatible way.

Observation 4 Backwards compatibility can be kept by embedding additional grant information in RAR.

Observation 5 From a security perspective, DL data multiplexed with RRC Connection Resume in Message 4 is ciphered with the same solution as early data transmission in Message 3.

Based on the discussion above, the following is proposed:

Proposal 1 RAN2 should specify support for early data transmission in Message 3.

Proposal 2 An additional grant is provided in RAR for early transmission in Message 3.

Proposal 3 Early data in Message 2 is not specified.

Proposal 4 Specify details for early data transmission support for MT data in Message 4.

Assumptions for the Analysis

Figure 21:
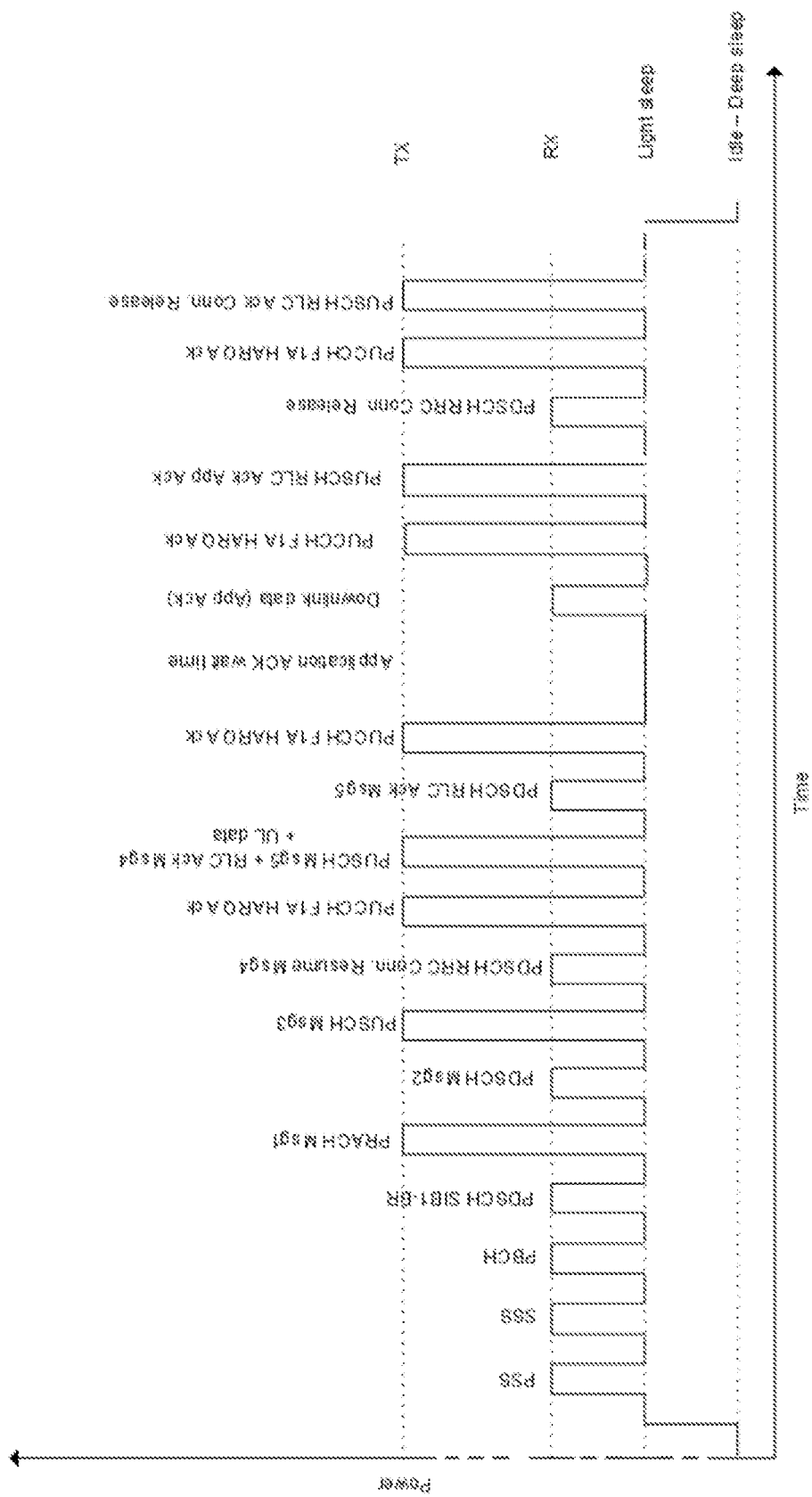
FIG. 21 illustrates the data and signalling to model RRC Resume battery performance.

FIG. 21 presents the data and signalling to model RRC Resume battery performance. The UE is assumed to consist of four parts which can be enabled/disabled somewhat independently: Transmission chain (TX), reception chain (RX), Idle mode (i.e. accurate clock to keep frame/symbol timing etc.) and deep sleep, where only a coarse clock is running and the UE is basically switched off otherwise. The power consumption of each of these parts is presented in TABLE 6 below.

DL assignments and UL grants are not explicitly shown in FIG. 21 for clarity, but they are included in the model. An Active timer of 10 seconds is assumed after the procedure, after which the UE enters PSM. The wait time after UL data before DL application Ack is tried to be received is 1000 ms (according to 3GPP TR 45.820).

TABLE 4 and TABLE 5 present the application layer assumptions used for evaluation of battery life performance.

TABLE 1

Release 13 battery life evaluation scenarios.

| Message type | UL report | DL Application Acknowledgment |
|---|---|---|
| Size | 200 bytes | 50 bytes | 65 bytes |
| Arrival rate | Once every 2 h or once every 24 h | |

TABLE 2

Release 14 battery life evaluation scenarios.

| Message type | UL report | DL Application Acknowledgment |
|---|---|---|
| Size | 200 bytes | 20 bytes |
| Arrival rate | Once every 24 h | |

TABLE 3 presents the power consumption assumptions used for evaluation of battery life performance taken from the Rel-13 NB-IoT evaluations. The results derived using this model depend on the used values and we welcome any feedback regarding these assumptions. The same models can be used for UL latency evaluation, but note that the arrival rate or the DL message size do not have an effect as the uplink latency is calculated up to the point where the UE has sent (and eNB received) the uplink data packet(s).

TABLE 3

Release 13 power consumption levels.
Device power consumption

| TX (23 dBm, integrated PA: 45% eff.) | 500 mW (incl. 60 mW support circuity) |
|---|---|
| RX | 80 mW |
| Light sleep | 3 mW |
| Idle-Deep sleep | 0.015 mW |

The table depicted in FIG. 25 presents the higher layer assumptions used for evaluation of latency and battery life performance. Specifically, FIG. 25 summarizes assumptions on core network protocol overheads and RRC message sizes.

The tables depicted in FIGS. 26 and 27 present the radio related assumptions used for evaluation of latency and battery life performance. For power consumption evaluation we use average values, where available, and for latency calculation the 90th percentile values.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
CDMA Code Division Multiplexing Access
CE Coverage Enhanced/Enhancement
C-RNTI Cell RNTI
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMTC enhanced Machine-Type Communications
eNB E-UTRAN NodeB or evolved nodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IoT Internet of Things
LOS Line of Sight
LPP LTE Positioning Protocol
LTE Long-Term Evolution
M2M Machine-to-Machine
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
MTC Machine-Typ Communications
NAS Non-Access Stratum
NB-IoT Narrowband Internet of Things
NPDCCH Narrowband Physical Downlink Control Channel
(N)PRACH (Narrowband) Physical Random Access Channel
NR New Radio
OCNG OFDMA Channel Noise Generator
OFDM Orthogonal Frequency Division Multiplexing
OFDMA Orthogonal Frequency Division Multiple Access
OSS Operations Support System
O&M Operation and Maintenance
PBCH Physical Broadcast Channel
P-CCPCH Primary Common Control Physical Channel
PCell Primary Cell
PDCCH Physical Downlink Control Channel
PDSCH Physical Downlink Shared Channel
PDU Protocol Data Unit
PGW Packet Gateway
PLMN Public Land Mobile Network
PRACH Physical Random Access Channel
PRB Physical Resource Block
PUCCH Physical Uplink Control Channel
PUSCH Physical Uplink Shared Channel
RACH Random Access Channel
RA Random Access
RAN Radio Access Network
RAR Random Access Response
RAT Radio Access Technology
RNC Radio Network Controller
RNTI Radio Network Temporary Identifier
RRC Radio Resource Control
RS Reference Signal
SFN System Frame Number
SI System Information
SS Synchronization Signal
SSS Secondary Synchronization Signal
TBS Transport Block Size
UE User Equipment UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network
WI Work Item

The invention claimed is:

1. A method performed by a wireless device for retransmitting message 3, the method comprising:
   transmitting, to a base station, a first transmission of a message 3, the message 3 comprising information to setup or resume a connection between the wireless device and the base station and user data;
   receiving, from the base station, downlink control information (DCI) comprising an uplink grant indicating a plurality of transport block sizes, the DCI being interpreted by the wireless device based on previous information received in a message 2 from the base station;
   selecting one of the plurality of transport block sizes for retransmission of the message 3, wherein the retransmission of the message 3 comprises either only the information to setup or resume the connection or the information to setup or resume the connection and user data to be sent to the base station; and
   retransmitting the message 3 using the selected one of the plurality of transport block sizes.

2. The method of claim 1, wherein the message 2 comprises a random access response message comprising the uplink grant indicating the plurality of transport block sizes allocated to the wireless device for the first transmission of the message 3.

3. The method of claim 1, wherein the message 3 comprises a radio resource control (RRC) connection request or an RRC connection resume request or RRC connection re-establishment request.

4. The method of claim 1, further comprising receiving, from the base station, a message 4 comprising a contention resolution message completing the connection between the wireless device and the base station, wherein the message 4 is received after the retransmission of the message 3.

5. The method of claim 1, wherein the first transmission of the message 3 is transmitted using the selected one or more of the plurality of transport block sizes.

6. The method of claim 1, wherein the first transmission of the message 3 is transmitted using a one of the plurality of transport block sizes that is different from the selected one or more of the plurality of transport block sizes used for the retransmission of the message 3.

7. The method of claim 1, further comprising:
   starting a timer associated with the first transmission of a message 3;
   determining that the timer has expired prior to receiving an acknowledgment from the base station indicating that the base station received the first transmission of the message; and
   sending the retransmission of the message 3 in response to determining that the timer has expired prior to receiving an acknowledgment from the base station.

8. The method of claim 1, wherein the DCI comprises at least one of a time resource and a frequency resource for use in the retransmission of the message 3.

9. The method of claim 8, wherein the at least one of the time resource and the frequency resource for use in the retransmission of the message 3 has an identical size to at least one of a time resource and a frequency resource used for the first transmission of the message 3.

10. The method of claim 9, wherein the at least one of the time resource and the frequency resource for use in the retransmission of the message 3 has a different size from at least one of a time resource and a frequency resource used for the first transmission of the message 3.

11. The method of claim 10, wherein the at least one of the time resource and the frequency resource for use in the retransmission of the message 3 is shifted from at least one of a time resource and a frequency resource used for the first transmission of the message 3.

12. The method of claim 1, wherein the DCI comprises at least a time resource and a frequency resource for each one of the plurality of transport block sizes.

13. The method of claim 1, further comprising:
   providing user data; and
   forwarding the user data to a host computer via the transmission to the base station.

14. A method performed by a base station for receiving a message 3, the method comprising:
   transmitting, to a wireless device, downlink control information (DCI) to schedule a retransmission of a message 3, the DCI being interpreted by the wireless device based on the content of previous message 2, the DCI comprising an uplink grant indicating one or a plurality of transport block sizes; and
   receiving, from the wireless device, the retransmission of the message 3, the retransmission of the message 3 transmitted based on one or more of the plurality of transport block sizes in the DCI, the retransmission of the message 3 comprising either only information to set up or resume a connection between the wireless device and the base station or both information to setup or resume the connection between the wireless device and the base station and user data.

15. The method of claim 14, further comprising:
   transmitting, to the wireless device, the message 2, the message 2 comprising a random access response message comprising the plurality of transport block sizes allocated to the wireless device for the first transmission of the message 3.

16. The method of claim 14, wherein the message 3 comprises a radio resource control (RRC) connection setup request or an RRC connection resume request or RRC connection re-establishment request.

17. The method of claim 14, further comprising transmitting, to the wireless device, a message 4, the message 4 comprising a contention resolution message completing the connection between the wireless device and the base station, wherein the message 4 is transmitted after the retransmission of the message 3 is received.

18. The method of claim 14, further comprising:
   prior to transmitting the DCI to schedule the retransmission of the message 3, receiving an initial transmission of the message 3; and
   determining that at least a portion of the initial transmission of the message 3 cannot be decoded.

19. The method of claim 14, wherein the DCI comprises at least one of a time resource and a frequency resource for use in the retransmission of the message 3.

20. The method of claim 19, wherein the at least one of the time resource and the frequency resource for use in the retransmission of the message 3 has an identical size to at least one of a time resource and a frequency resource used for an initial transmission of the message 3.

21. The method of claim 19, wherein the at least one of the time resource and the frequency resource for use in the retransmission of the message 3 has a different size from at least one of a time resource and a frequency resource used for an initial transmission of the message 3.

22. The method of claim 21, wherein the at least one of the time resource and the frequency resource for use in the retransmission of the message 3 is shifted from at least one of a time resource and a frequency resource used for the initial transmission of the message 3.

23. The method of claim 14, wherein the DCI comprises at least a time resource and a frequency resource for each one of the plurality of transport block sizes.

24. The method of claim 14, further comprising:
obtaining user data; and
forwarding the user data to a host computer or a wireless device.

25. A wireless device comprising:
processing circuitry configured to:
transmit, to a base station, a first transmission of a message 3, the message 3 comprising information to setup or resume a connection between the wireless device and the base station and user data;
receive, from the base station, downlink control information (DCI) comprising an uplink grant indicating a plurality of transport block sizes, the DCI being interpreted by the wireless device based on previous information received in a message 2 from the base station;
select one or more of the plurality of transport block sizes for retransmission of the message 3, wherein the retransmission of the message 3 comprises either only the information to setup or resume the connection between the wireless device and the base station or the information to setup or resume the connection between the wireless device and the base station and user data to be sent to the base station; and
retransmit the message 3 using the selected one or more of the plurality of transport block sizes; and
power supply circuitry configured to supply power to the wireless device.

26. The wireless device of claim 25, wherein the message 2 comprises a random access response message comprising the plurality of transport block sizes allocated to the wireless device for the first transmission of the message 3.

27. The wireless device of claim 25 wherein the message 3 comprises a radio resource control (RRC) connection request or a RRC reconnection request.

28. The wireless device of claim 25 wherein the processing circuitry is configured to receive, from the base station, a message 4 comprising a contention resolution message completing the connection between the wireless device and the base station, wherein the message 4 is received after the retransmission of the message 3.

29. The wireless device of claim 25, wherein the first transmission of the message 3 is transmitted using the selected one or more of the plurality of transport block sizes.

30. The wireless device of claim 25, wherein the first transmission of the message 3 is transmitted using a one of the plurality of transport block sizes that is different from the selected one or more of the plurality of transport block sizes used for the retransmission of the message 3.

31. The wireless device of claim 25, wherein the processing circuitry is configured to:
start a timer associated with the first transmission of a message 3; and
determine that the timer has expired prior to receiving an acknowledgment from the base station indicating that the base station received the first transmission of the message; and
send the retransmission of the message 3 in response to determining that the timer has expired prior to receiving an acknowledgment from the base station.

32. The wireless device of claim 25, wherein the DCI comprises at least one of a time resource and a frequency resource for use in the retransmission of the message 3.

33. The wireless device of claim 32, wherein the at least one of the time resource and the frequency resource for use in the retransmission of the message 3 has an identical size to at least one of a time resource and a frequency resource used for the first transmission of the message 3.

34. The wireless device of claim 33, wherein the at least one of the time resource and the frequency resource for use in the retransmission of the message 3 has a different size from at least one of a time resource and a frequency resource used for an initial transmission of the message 3.

35. The wireless device of claim 33, wherein the at least one of the time resource and the frequency resource for use in the retransmission of the message 3 is shifted from at least one of a time resource and a frequency resource used for the first transmission of the message 3.

36. The wireless device of claim 25, wherein the DCI comprises at least a time resource and a frequency resource for each one of the plurality of transport block sizes.

37. A base station comprising:
processing circuitry configured to:
transmit, to a wireless device, downlink control information (DCI) to schedule a retransmission of a message 3, the DCI being interpreted by the wireless device based on the content of previous message 2, DCI comprising an uplink grant indicating a plurality of transport block sizes; and
receive, from the wireless device, the retransmission of the message 3, the retransmission of the message 3 transmitted based on one or more of the plurality of transport block sizes in the DCI, the retransmission of the message 3 comprising either only information to setup or resume a connection between the wireless device and the base station or both information to setup or resume the connection between the wireless device and the base station and user data; and
power supply circuitry configured to supply power to the wireless device.

38. The base station of claim 37, wherein the processing circuitry is further configured to:
transmit, to the wireless device, the message 2, the message 2 comprising a random access response message comprising the plurality of transport block sizes allocated to the wireless device for the first transmission of the message 3.

39. The base station of claim 37, wherein the message 3 comprises a radio resource control (RRC) connection request or a RRC reconnection request.

40. The base station of claim 37, wherein the processing circuitry is configured to transmit, to the wireless device, a message 4, the message 4 comprising a contention resolution message completing the connection between the wireless device and the base station, wherein the message 4 is transmitted after the retransmission of the message 3 is received.

41. The base station of claim 37, wherein the processing circuitry is configured to:
prior to transmitting the DCI to schedule the retransmission of the message 3, receive an initial transmission of the message 3; and
determine that at least a portion of the initial transmission of the message 3 cannot be decoded.

42. The base station of claim 37, wherein the DCI comprises at least one of a time resource and a frequency resource for use in the retransmission of the message 3.

43. The base station of claim 42, wherein the at least one of the time resource and the frequency resource for use in the retransmission of the message 3 has an identical size to at least one of a time resource and a frequency resource used for the first transmission of the message 3.

44. The base station of claim 42, wherein the at least one of the time resource and the frequency resource for use in the retransmission of the message 3 has a different size from at least one of a time resource and a frequency resource used for an initial transmission of the message 3.

45. The base station of claim 42, wherein the at least one of the time resource and the frequency resource for use in the retransmission of the message 3 is shifted from at least one of a time resource and a frequency resource used for the initial transmission of the message 3.

46. The base station of claim 37, wherein the DCI comprises at least a time resource and a frequency resource for each one of the plurality of transport block sizes.

\* \* \* \* \*